(12) United States Patent
Streu

(10) Patent No.: US 12,423,278 B2
(45) Date of Patent: *Sep. 23, 2025

(54) SYSTEMS AND METHODS FOR RESOLVING RELATIONSHIPS WITHIN DATA SETS

(71) Applicant: WALGREEN CO., Deerfield, IL (US)

(72) Inventor: Bryan Streu, Arlington Heights, IL (US)

(73) Assignee: WALGREEN CO., Deerfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/237,562

(22) Filed: Aug. 24, 2023

(65) Prior Publication Data

US 2023/0394046 A1 Dec. 7, 2023

Related U.S. Application Data

(63) Continuation of application No. 16/938,906, filed on Jul. 24, 2020, now Pat. No. 11,775,532.

(Continued)

(51) Int. Cl.
*G06F 16/20* (2019.01)
*G06F 9/46* (2006.01)
(Continued)

(52) U.S. Cl.
CPC ............ *G06F 16/215* (2019.01); *G06F 9/466* (2013.01); *G06F 9/52* (2013.01); *G06F 16/2457* (2019.01); *G06F 16/288* (2019.01); *G06F 16/908* (2019.01)

(58) Field of Classification Search
CPC .. G06F 16/2457; G06F 16/288; G06F 16/908; G06F 9/466; G06F 9/52

(Continued)

(56) References Cited

U.S. PATENT DOCUMENTS 6,707,989 B1 * 3/2004 Ka'ahumanu ............ G09F 3/14
40/6
7,912,842 B1 * 3/2011 Bayliss .................. G06F 16/215
707/749

(Continued)

OTHER PUBLICATIONS

Yan et al., Entity Matching in the Wild: A Consistent and Versatile Framework to Unify Data in Industrial Applications; ACM 2020.*

(Continued)

*Primary Examiner* — Daniel A Kuddus
(74) *Attorney, Agent, or Firm* — MARSHALL, GERSTEIN & BORUN LLP; Randall G. Rueth

(57) ABSTRACT

Techniques for fully or comprehensively resolving relationships within and among different data sets are disclosed. The techniques evaluate identification tags of respective transaction records to resolve transitive relationships between and among the identification tags, which vary across the different data sets. Based on this resolving, the techniques comprehensively sort the identification tags into mutually exclusive sets of related identification tags. Additionally, the techniques resolve and sort identification tags that are transitively unrelated to every other identification tag. At least these features enable comprehensive identification and intelligent sorting of related/unrelated transaction records, provide enhanced transaction tracking and security, more efficient and accurate transaction record storage (and in particular, of composite records), and enhanced tracking accuracy of accounts or types of units as compared to known techniques. The techniques utilize recursive resolution to comprehensively and accurately resolve all data relationships among the different data sets.

15 Claims, 4 Drawing Sheets

Related U.S. Application Data

(60) Provisional application No. 63/052,299, filed on Jul. 15, 2020.

(51) Int. Cl.
  *G06F 9/52*       (2006.01)
  *G06F 16/215*     (2019.01)
  *G06F 16/2457*    (2019.01)
  *G06F 16/28*      (2019.01)
  *G06F 16/908*     (2019.01)

(58) Field of Classification Search
  USPC ................................ 707/769, 796, 758, 805
  See application file for complete search history.

(56) References Cited

U.S. PATENT DOCUMENTS

| | | | | |
|---|---|---|---|---|
| 8,836,480 | B2* | 9/2014 | Wilfred | G06K 19/0723 |
| | | | | 340/572.1 |
| 8,837,954 | B2* | 9/2014 | Primm | G06K 7/1097 |
| | | | | 398/127 |
| 9,135,669 | B2* | 9/2015 | Roemerman | G06Q 10/08 |
| 9,934,486 | B2* | 4/2018 | Vargas | G06K 19/072 |
| 10,127,289 | B2* | 11/2018 | Manning | G06F 16/35 |
| 10,964,299 | B1* | 3/2021 | Estes | G10H 1/0025 |
| 2001/0010333 | A1* | 8/2001 | Han | G11B 23/281 |
| 2002/0066418 | A1* | 6/2002 | Fearing | A01K 11/004 |
| | | | | 119/859 |
| 2002/0145050 | A1* | 10/2002 | Jayaratne | G06Q 20/40145 |
| | | | | 235/492 |
| 2007/0035383 | A1 | 2/2007 | Roemerman et al. | |
| 2007/0133164 | A1 | 6/2007 | Xu et al. | |
| 2008/0012714 | A1 | 1/2008 | Furutani et al. | |
| 2009/0309733 | A1* | 12/2009 | Moran | G06K 19/041 |
| | | | | 340/572.1 |
| 2011/0318013 | A1* | 12/2011 | Primm | G06K 7/1097 |
| | | | | 398/115 |
| 2012/0078919 | A1* | 3/2012 | Mineno | G06F 40/295 |
| | | | | 707/E17.069 |
| 2012/0166372 | A1* | 6/2012 | Ilyas | G06N 7/01 |
| | | | | 706/14 |
| 2014/0104039 | A1* | 4/2014 | Wilfred | G06K 19/06056 |
| | | | | 235/492 |
| 2016/0202702 | A1* | 7/2016 | Bruemmer | G06N 7/01 |
| | | | | 700/255 |
| 2021/0357183 | A1* | 11/2021 | Maier | G06F 16/953 |

OTHER PUBLICATIONS

Yan et al., Entity matching in the wild: A consistent and versatile framework to unify data in industrial applications, SIGMOD 20, Jun. 14-19, 2020, Portland, Oregon, US.

European Patent Application No. 21175546.7, Extended European Search Report, dated Nov. 29, 2021.

* cited by examiner

SYSTEMS AND METHODS FOR RESOLVING RELATIONSHIPS WITHIN DATA SETS

RELATED APPLICATIONS

The present application is a continuation of U.S. patent application Ser. No. 16/938,906, entitled "Systems and Methods for Resolving Relationships Within Data Sets," filed on Jul. 24, 2020, which claims priority to U.S. Provisional Patent Application No. 63/052,299, entitled "Systems and Methods for Resolving Relationships Within Data Sets," filed on Jul. 15, 2020, the entire disclosure of which is hereby expressly incorporated by reference herein.

FIELD OF THE DISCLOSURE

The present disclosure generally relates to resolving relationships of data within data sets, to thereby provide increased overall security and fidelity of transaction records and to enhance the accuracy of tracking accounts, e.g., within a business entity.

BACKGROUND

Generally speaking, many enterprises or business entities service customer bases large enough that the only reasonable way to track customer accounts (e.g., the customers' respective purchases, returns, accounts receivable, etc.) is through a computerized customer database. Many such databases assign each customer a unique identification number or tag (referred to herein interchangeably as a "customer ID," or "customer ID tag") and use that customer ID to catalog and track the customer's account within the database. Typically, each time a customer transacts with the business entity, a corresponding entry is made into the customer database, where the entry includes the customer-specific ID and additional information associated with the specific transaction. These entries are generally sorted by customer ID, and thereby collectively form a transaction record of each customer with the business entity.

More recently, many enterprises or business entities have developed multiple service avenues via which customers transact with the business entities. Websites, mobile applications, mail-in services, and even distinct branches located within or otherwise associated with a business entity (e.g., different pharmacies located within different drug store locations of a business entity) enable customers to transact with the business entity through a variety of platforms, thereby creating a variety of transaction records. Typically, each of these different platforms or service avenues may have a separate or local customer database in which respective transaction records of each customer corresponding to the respective platform/service avenue are created and stored. These separate customer databases may be collectively synchronized and/or aggregated to create composite customer transaction records across the entire business entity; however, at least due to different database syntaxes and formats, data entry inconsistencies, and the like, various issues may arise, for example, individual transactions and other information may occasionally be improperly associated with the wrong customer, a specific customer may be improperly perceived to be multiple different customers within the composite record, or information may simply be lost in the synchronization process.

Therefore, a composite customer database of a business entity may not accurately reflect the transaction records of a particular customer with the business entity. This problem is acutely pronounced given the sheer number of customers of the business entity and given the coordination of interactions of the business entity's systems with systems of other business entities (e.g., insurance companies, electronic payment vendors, marketers, etc.). A business entity may process tens to hundreds of thousands of transactions every day, resulting in the same voluminous number of transaction records being created and catalogued. If a single customer's transaction records are incorrectly catalogued, though, the customer may be unable to return a product that the customer legitimately purchased, may not receive necessary prescription medication refills, may be improperly billed, etc. These problems may be further compounded as such existing composite customer databases typically assign randomly generated IDs for each composite customer transaction record. These randomly generated IDs are unintuitive and create confusion when attempting to resolve errors or other problems related to composite customer transaction records.

Accordingly, there is a need for systems and methods for resolving relationships within data sets to provide increased fidelity and security of composite transaction records across an enterprise or business entity, and to enhance the accuracy of tracking accounts and/or transactions of particular customers across the business entity.

SUMMARY

Generally, the systems, methods, and techniques for resolving relationships within multiple, different data sets (also interchangeably referred to herein as "data relationship resolving," "data resolution," or "resolution" systems, methods, and techniques) fully resolve the data relationships between and among the different data sets, thereby increasing the security and fidelity of a composite record generated from the multiple data sets and increasing the accuracy of the tracking of units (e.g., individuals, interaction types, accounts, transaction types, etc.) within the composite record. Generally speaking, the terms "composite record" and "composite records" are utilized interchangeably herein to refer to an aggregation and synchronization of data records (e.g., transaction records) of multiple, different databases. As such, a plurality of composite records may be considered to be a "composite database," which includes data stored therein which originated in (e.g., was obtained from) various ones of the multiple, different databases.

In an example application of resolving data sets, an enterprise, business entity, or organization may have multiple platforms and/or service avenues that are maintained across multiple, disparate databases which are independently administered. The enterprise may desire to synchronize and aggregate the records of the multiple databases based on a particular type of unit, for example, a customer, patient, or individual. For example, a university may generate and administer academic records, financial aid records, bursar records, health care records, electronic student email accounts, virtual classrooms, etc. in different databases or data sets, and may desire to synchronize and aggregate the records of the multiple databases on a per-student basis. In another example, a pharmacy enterprise may generate and administer pharmacy records, mobile application records, records of medical procedures which the pharmacy provides to customers, loyalty account records, billing records, etc., and may wish to synchronize and/or aggregate respective data sets corresponding thereto on a per-customer or per-patient basis.

For ease of illustration and discussion, and not for limitation purposes, the example application of the pharmacy enterprise is utilized herein to demonstrate embodiments and aspects of the disclosed systems, methods, and techniques, and resulting advantages and benefits. However, it is understood that the systems, methods, and techniques described herein are easily applicable to other applications in which records of multiple, different data sets are synchronized and aggregated into a composite record.

Within the pharmacy enterprise example application, the unit via which the composite record is to be aggregated and synchronized is a customer, and the multiple data sets are referred to interchangeably herein as "customer data sets," "customer databases," "customer data sets," "customer transaction databases," "customer transaction data sets," "transaction databases," or "transaction data sets," where each data set includes respective transaction records for a corresponding platform and/or service avenue provided by the pharmacy enterprise (e.g., pharmacy transaction records, mobile application transaction records, medical procedure transaction records, in-store purchase and return transaction records, etc. As referred to herein, a "transaction record" may include a record of any purchase, return, registration, communication, and/or any other interaction between a customer and a platform/service avenue of the enterprise, organization, or business entity (which, in this example application, is a pharmacy enterprise), and optionally between the customer and any other entity related to the enterprise (e.g., in this example application, a physician or other health care provider, an insurance company, etc.).

The systems, methods, and techniques disclosed herein allow the pharmacy enterprise or business entity to maintain up-to-date and accurate composite transactional records for each customer, including single transaction customers that conventional data resolution systems often lose or otherwise overlook. Namely, the systems and methods described herein evaluate transitive relationships between the various customer identifications (IDs) which are utilized by the multiple different customer databases or data sets to intuitively and accurately group and label related customer IDs in a manner that reduces the errors and other problems experienced by conventional data resolution systems.

To illustrate, the term "transitive relationship" is generally utilized herein to denote a relationship between several data points, e.g., when a first data point is related to a second data point, and when the second data point is related to a third data point by the same relationship as the first data point, then the first data point is also necessarily related to the third data point by the same relationship. As a simple example, assume the following relationships are true:

$$A=B \quad (1)$$

$$B=C \quad (2)$$

where A, B, and C are all integer values. Based on equations (1) and (2), a relationship exists between A and B and a relationship exists between B and C. Assuming further that the relationship between both A and B and B and C is the same transitive relationship (e.g., the numerical values of A and B are equivalent, and the numerical values of B and C are equivalent), then it is also necessarily true that:

$$A=C \quad (3)$$

such that A, B, and C are all transitively related. To illustrate transitive relationships using equivalent customer IDs, if "Chris Smith" is the same customer as "Christopher Smith," and "Christopher Smith" is the same customer as "Christopher A. Smith," then "Chris Smith" is the same customer as "Christopher A. Smith."

However, the term "transitive relationship," as used herein, is not limited to referring to only equivalent transitive relationships, but is also utilized herein to refer to associated transitive relationships. For example, two data points or ID tags may not be transitively related through equivalency, but may be transitively related through a common or associated transitive relationship to a third data point or ID tag, as is discussed in more detail below.

As used herein, the term "ID tag" refers to a general category which may be utilized within a database (similar to the purpose of a heading of a column of data). Examples of data types that may be included in an ID tag include customer IDs (as previously discussed), customer name, customer address, transaction types (e.g., in-person purchase, mobile application purchase, product return, prescription pickup, customer service query, medical procedure, etc.), interaction types (e.g., chat box, email, telephone call, etc.), date, pharmacy location, and the like.

Accordingly, to illustrate associated transitive relationships, in an example scenario, a system of the present disclosure may sort a plurality of ID tags utilized in a plurality of different pharmacy enterprise databases (e.g., which correspond to different platforms and/or service avenues of the pharmacy enterprise) into groups or sets based on customer name and transaction type. Not all of the ID tags which are sorted into a particular group or set are required to originate from a same customer database; indeed, a sorted group or set may include various ID tags of different customer databases of the pharmacy business entity that are transitively related by equivalency (e.g., "Chris Smith" and "Christopher Smith"). At any rate, when sorted, a first group or set of ID tags may include a first ID tag containing a first customer name, a second ID tag containing a first transaction type, and a third ID tag containing both the first customer name and the first transaction type. In this scenario, the first ID tag and the second ID tag are transitively related in an associated manner due to their shared, associated transitive relationship to the third ID tag. If the third ID tag is removed from the first set of ID tags, then the first ID tag and the second ID tag may no longer maintain their associated transitive relationship via the (now removed) third ID tag. Thus, in a general sense, within a sorted group or set, if two ID tags, ID strings, and/or other identifiers or data are transitively related, e.g., by equivalency and/or by association, then it is necessarily true that the two ID tags, ID strings, and/or other identifiers or data share an equivalent and/or an associated transitive relationship to each other and/or to at least one other ID tag, ID string, and/or other identifier or data included in the sorted group or set.

In addition, the transitive relationship of a particular ID tag may be "fully resolved" when the complete set of other ID tags to which the particular ID tag is transitively related (both by equivalency and by association) have been identified and are known to the system. To continue the above example scenario, the transitive relationship of the third ID tag is fully resolved when the system knows that the third ID tag is transitively related to the first ID tag and to the second ID tag and to no other ID tags that are known to the system. In certain scenarios, an ID tag may have a fully resolved relationship without being transitively related to any other ID tags. Such ID tags are referred to herein as "reflective ID tags." Said another way, a specific ID tag may be a "reflective ID tag" if the specific ID tag is transitively unrelated (e.g., by equivalency and by association) to all other ID tags known to the system.

In accordance with the discussions herein, the present disclosure includes improvements in computer functionality at least because the disclosure describes that a system, e.g., one or more servers or computing devices, is improved in that the security and fidelity of data and databases stored at the servers/computing devices (e.g., transaction records and accounts recorded by the one or more servers or computing devices) is enhanced by an identification tag transformation module, including both a transitive relationship resolver and a reflective ID resolver. As is discussed elsewhere in the present disclosure, the identification tag transformation module, executing on the one or more servers or other computing devices, is able to accurately and comprehensively identify, based on ID tags included in transaction records, all other ID tags included within the transaction records (if any) to which a respective ID tag is transitively related. That is, the present disclosure describes improvements in the functioning of the computer itself because the one or more servers or computing devices are enhanced with an identification tag transformation module to accurately determine all transitive relationships corresponding to both reflective and non-reflective ID tags, thereby allowing data and database fidelity to be improved, and in particular, allowing data and fidelity of composite records and databases to be improved. The identification tag transformation module may decrease the required memory capacity for servers/computing devices storing the data and databases (e.g., composite databases) by eliminating duplicitous/extraneous data entries and by consolidating the remaining data entries into fully resolved, intuitively-labeled data sets.

For similar reasons, the present disclosure relates to improvements to other technologies or technical fields at least because the present disclosure describes or introduces improvements in the fields of transactions, analytics, data resolution, and data consolidation technologies. Namely, the identification tag transformation module executing on the server or other computing devices improves the fields of transactions, analytics, data resolution, and data consolidation by introducing the capability to identify and sort both reflective and non-reflective IDs into one or more mutually exclusive sets of related identification tags in a more complete and comprehensive manner as compared to the prior art. This improves over the prior art at least because existing systems lack such identification and/or sorting functionality, and are simply not capable of accurately and comprehensively analyzing transaction records to sort both reflective and non-reflective IDs into one or more mutually exclusive sets of related ID tags.

In addition, the present disclosure includes specific features other than what is well-understood, routine, conventional activity in the field, or adding unconventional steps that confine the claim to a particular useful application, e.g., determining whether or not a transitive relationship exists between each unique pair of identification tags in a plurality of identification tags to sort the plurality into one or more mutually exclusive sets of related identification tags, with at least one mutually exclusive set each including a respective lone member, wherein the respective lone member is a reflective identification tag, among others.

In an embodiment, a computer-implemented method for resolving relationships within data sets is disclosed. The method comprises obtaining, at one or more processors, a plurality of identification tags. Additionally, the method may include determining, by the one or more processors, whether or not a transitive relationship exists between each unique pair of identification tags in the plurality of identification tags and, based on the determining, sorting, by the one or more processors, the plurality of identification tags into one or more mutually exclusive sets of related identification tags. At least one mutually exclusive set each may include a respective lone member, the respective lone member being a respective reflective identification tag.

In an embodiment, a system for resolving relationships within data sets is disclosed. The system may include one or more processors and one or more non-transitory memories, and the one or more non-transitory memories may store computer-readable instructions that specially configure the system such that, when executed by the one or more processors, the one or more non-transitory memories cause the system to: obtain a plurality of identification tags, determine whether or not a transitive relationship exists between each unique pair of identification tags in the plurality of identification tags, and based on the determination, sort the plurality of identification tags into one or more mutually exclusive sets of related identification tags. At least one mutually exclusive set each may include a respective lone member, the respective lone member being a respective reflective identification tag.

In an embodiment, a non-transitory computer-readable storage medium having stored thereon a set of instructions, executable by one or more processors, for resolving relationships within data sets is disclosed. The instructions may include instructions for obtaining a plurality of identification tags, and for determining whether or not a transitive relationship exists between each unique pair of identification tags in the plurality of identification tags. The instructions may also include instructions for, based on the determining, sorting the plurality of identification tags into one or more mutually exclusive sets of related identification tags. At least one mutually exclusive set each may include a respective lone member, the respective lone member being a respective reflective identification tag.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1:
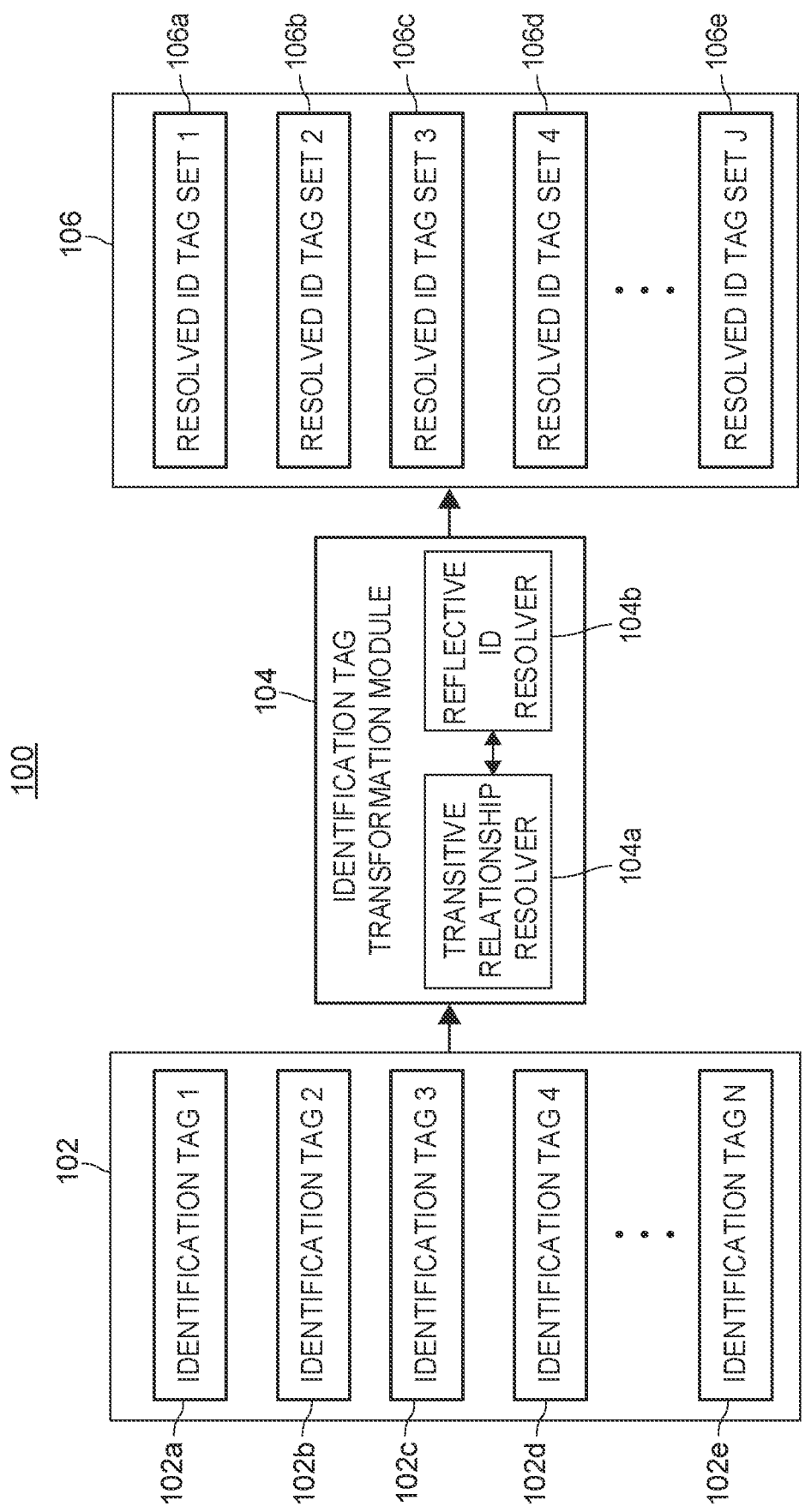
FIG. 1 illustrates an example workflow for resolving data relationships among multiple data sets in accordance with the systems, methods, and techniques described within this disclosure.

FIG. 1 illustrates an example workflow 100 for resolving relationships among multiple, different data sets and/or databases to provide increased overall security and fidelity of composite transaction records of the multiple data sets and/or databases, and to enhance the accuracy of tracking information associated with particular units, e.g., customer accounts, within the composite transaction records. As shown in FIG. 1, the example workflow 100 involves a set of identification tags 102, an identification tag transformation module 104, and a set of resolved identification (ID) tag sets 106. The set of identification tags 102 may include identification tags (e.g., of customers or other types of units) that have been obtained from a plurality of different data sets or databases, e.g., of a pharmacy business entity or enterprise, where the different databases may include and/or utilize different fields, use different syntaxes, etc. Generally, the example workflow 100 illustrates the identification tag transformation module 104 operating on the set of identification tags 102 (e.g., which have been obtained from one or more sets of transaction records from the different data sets) to transform the set of ID tags 102 into one or more different sets or groupings of ID tags 106a-106e whose relationships have been resolved, as represented in FIG. 1 by the set of resolved ID tag sets 106. That is, the identification tag transformation module 104 may help in creating a comprehensive and accurate set of composite transaction records from various transaction records of multiple, different data sets or databases at least by transforming an original or initial set of identification tags 102 of the various transaction records into the set of resolved ID tag sets 106 corresponding to the composite transaction records, where each resolved ID tag set 106a-106e is mutually exclusive in relation to every other resolved ID tag set 106a-106e. To this end, the identification tag transformation module 104 discovers and fully resolves the transitive relationships between and among the identification tags 102a-102e included in the set of identification tags 102 (e.g., between and among all of the identification tags included in the set 102), as well as discovers and resolves reflective identification tags included in the set of identification tags 102, e.g., by utilizing a transitive relationship resolver 104a and a reflective ID resolver 104b, as shown in FIG. 1. In an embodiment, the identification tag transformation module 104 discovers and fully resolves all transitive relationships between and among the set of identification tags 102, and/or discovers and fully resolves all reflective identification tags included in the set of identification tags 102.

Generally speaking, the identification tag transformation module 104 may determine whether or not a transitive relationship exists between each unique pair of identification tags included in the set of identification tags 102 by applying one or both of the transitive relationship resolver 104a and/or the reflective ID resolver 104b to the set of ID tags 102. For example, the set of identification tags 102 may include n unique identification tags, and the identification tag transformation module 104 may apply the transitive relationship resolver 104a and/or the reflective ID resolver 104b to evaluate the n identification tags in a pairwise manner until any and all transitive relationships (whether by equivalency and/or by association) between each identification tag of the set of identification tags 102 and every other identification tag of the set of identification tags 102 have been identified, and any and all reflective ID tags included in the set of identification tags 102 have been identified. Of course, n may represent any number of identification tags. Additionally, for some sets of tags 102, the transitive relationship resolver 104a and/or the reflective ID resolver 104b may operate on one or more individual identification tags of the set 102 multiple times before full resolution of the entire set 102 is achieved.

In an embodiment, the transitive relationship resolver 104a of the identification tag transformation module 104 may discover and fully resolve any and all transitive relationships (e.g., equivalently transitive, associatively transitive, or both) of each ID tag included in the set of identification tags 102 so that all non-reflective ID tags of the set 102 are grouped into one or more resolved ID tag sets 106, where each set of non-reflective, resolved ID tags (e.g., sets 106a, 106b, 106c) contains a different, mutually-exclusive subset of the set of ID tags 102 that are transitively related to other ID tags of the subset. Additionally, the transitive relationship resolver 104a may generate or assign a unique identifier for each non-reflective, resolved ID tag set (e.g., sets 106a, 106b, 106c). Typically, each unique identifier is indicative of the relationships of the members of the corresponding non-reflective, resolved ID tag set, and the unique identifiers of the different sets of resolved ID tag sets 106a-106e may utilize a same or common syntax or format.

The reflective ID resolver 104b may discover and fully resolve any and all reflective ID tags included in the set of identification tags 102. That is, the reflective ID resolver 104b may discover or determine the ID tags of the set of identification tags 102 which are transitively unrelated to every other identification tag included in the set of identification tags 102, and may sort each of such ID tags into its own reflective, resolved ID tag set, where each reflective, resolved ID tag set has one and only one member (e.g., sets 106d, 106e). In an embodiment, the reflective ID resolver 104b may cooperate with the transitive relationship resolver 104a to discover reflective ID tags within the set of ID tags 102. For example, the reflective ID resolver 104b may operate on any ID tags for which the transitive relationship resolver 104a was unable to find any transitive relationships, or for which the transitive relationship resolver 104a had indeterminate results. Further, the reflective ID resolver 104b may generate and assign a unique identifier for each reflective, resolved ID tag set (e.g., sets 106d, 106e), where each unique identifier is indicative of the lone member of the corresponding reflective, resolved ID tag set. Typically, the reflective ID resolver 104b and the transitive relationship resolver 104a cooperate to generate and assign the unique identifiers of the different resolved ID tag sets 106a-106e so that each resolved ID tag set 106a-106e is uniquely identified across the set 106 using a same or common syntax or format.

The identification tag transformation module 104 may apply one or both of the transitive relationship resolver 104a and/or the reflective ID resolver 104b to all, some, or none of the set of identification tags 102. In an example, assume a first identification tag, e.g., identification tag 1 (reference 102a), is transitively related to a second identification tag, e.g., identification tag 2 (reference 102b); however, the identification tag transformation module 104 has no knowledge of this transitive relationship a priori. The identification tag transformation module 104 may apply the transitive relationship resolver 104a to the first identification tag 102a and, as a result, the transitive relationship resolver 104a may discover or determine that the first identification tag 102a is transitively related to the second identification tag 102b. To illustrate, the first identification tag 102a may be a customer ID of "John Doe" associated with pharmacy transaction records of an enterprise, and the second identification tag 102b may be a customer ID of "John A. Doe" associated with medical procedure records of the enterprise, where the pharmacy transaction records and the medical procedure records are stored in different databases or data sets. When comparing the pair of identification tags 102a, 102b, the transitive relationship resolver 104a may determine that both identification tags 102a, 102b are customer IDs, and/or that both IDs have identical or similar field values and/or text strings. Additionally or alternatively, the transitive relationship resolver 104a may analyze and compare associated transaction data for the first identification tag 102a and associated transaction data for the second identification tag 102b to determine whether or not the two customer IDs 102a, 102b refer to the same person, and therefore are transitively related. For instance, the transitive relationship resolver 104a may determine that the respective transaction data associated with customer ID "John Doe" and the respective transaction data associated with similar customer ID "John A. Doe" share similar characteristics (e.g., same address, same date of birth, same social security number, etc.), and thereby may discover or determine the existence of the transitive relationship between ID tags 102a and 102b.

In embodiments, to determine degrees of similarity between different identification tags 102a, 102b, their respective associated data fields, and/or their associated data field values or data content, the transitive relationship resolver 104a may analyze and compare the different identification tags 102a, 102b, respective associated data fields, and/or respective associated data field values or data content (e.g., alphanumeric text strings, and/or other types of data) based on one or more predetermined or learned data types. For example, the transitive relationship resolver 104a may utilize one or more trained models to determine a degree of similarity between different types of identification tags, data fields, data field values, and/or data content to determine a likelihood or a probability that the transaction records in the pharmacy transaction database corresponding to "John Doe" 102a are or are not related to the transaction records in the medical procedure record database corresponding to "John A. Doe" 102b. For instance, with respect to ID tags 102a and 102b, the transitive relationship resolver 104a may utilize a first model to determine a likelihood that the text strings "John Doe" and "John A. Doe" are related, a second model to determine a likelihood that an address "123 Main St., Anytown, NM" corresponding to ID tag "John Doe" 102a is related to or is the same as an address "123 Main Street, Any Town, NM" corresponding to ID tag "John A. Doe" 102b, and/or a third model to determine the likelihood that the combination of "John Doe" and "123 Main St., Anytown, NM" corresponding to ID tag 102a is related to or the same as the combination "John A. Doe" and "123 Main Street, Any Town, NM" corresponding to ID tag 102b. Accordingly, the transitive relationship resolver 104a may utilize correlation thresholds, similarity values, confidence intervals, any other suitable metric and/or combinations thereof to determine or predict whether or not two compared identification tags 102a, 102b and/or their respective, associated transaction records, data fields, data field values, and/or data content are related to the same person or unit.

Continuing with this example, as the transitive relationship resolver 104a has determined that the first identification tag "John Doe" 102a is transitively related to at least one other identification tag (e.g., the second identification tag "John A. Doe" 102b) and that the second identification tag "John A. Doe" 102b is transitively related to at least one other identification tag (e.g., the first identification tag "John Doe" 102a), the identification tag transformation module 104 may not subsequently apply the reflective ID resolver 104b to the first identification tag 102a or to the second identification tag 102b. Instead, the identification tag transformation module 104 (e.g., via the transitive relationship resolver 104a) may sort or otherwise designate the first identification tag 102a and the second identification tag 102b to be members of a same non-reflective, resolved ID tag set, e.g., non-reflective, resolved ID tag set 106a, where all members of the non-reflective, resolved ID tag set 106a are related to the customer John Doe/John A. Doe. That is, both identification tags 102a, 102b are sorted into or otherwise assigned to the non-reflective, resolved ID tag set 106a. The identification tag transformation module 104 (e.g., via the transitive relationship resolver 104a) may generate and/or assign a unique identifier for the non-reflective, resolved ID tag set 106a.

Subsequently, the identification tag transformation module 104 may continue evaluating transitive relationships between other pairs of identification tags of the set of identification tags 102a by applying the transitive relationship resolver 104a and/or the reflective ID resolver 104b thereto. The other pairs may or may not include one of the identified, non-reflective identification tags 102a, 102b.

For example, upon designating the identification tags 102a, 102b as members of the non-reflective, resolved ID tag set 106a, the identification tag transformation module 104 may apply the transitive relationship resolver 104a and/or the reflective ID resolver 104b to another pair of identification tags consisting of the identification tag 4 (reference 102d) representing customer ID "J. Doe" and the identification tag 1 (reference 102a) representing customer ID "John Doe," which has already been designated as a member of the resolved ID tag set 106a.

In one possible scenario, the transitive relationship resolver 104a may discover or determine that a transitive relationship exists between the identification tag "J. Doe" 102d and the identification tag "John Doe" 102a (e.g., in a manner similar to that discussed above for discovering the transitive relationship between identification tags 102a and 102b). As such, the transitive relationship resolver 104a may add the identification tag 102d to the non-reflective, resolved ID tag set 106a, and may optionally update, re-configure, revise, and/or re-assign the unique identifier for the resolved ID tag set 106a based on the addition of the identification tag 102d. In a similar manner, if the transitive relationship resolver 104a further discovers or determines that a transitive relationship exists between any of the identification tags that have been already sorted or grouped into the non-reflective, resolved ID tag set 106a (e.g., ID tags 102a, 102b, 102d) and any of the other remaining identification tags included in the set of identification tags 102, the further discovered transitively related identification tags may be added to the non-reflective, resolved ID tag set 106a, and optionally, the unique identifier of the resolved ID tag set 106a may be updated accordingly.

In another possible scenario, the transitive relationship resolver 104a may be unable to discover or determine that a transitive relationship exists between the identification tag 102d "J. Doe" and the identification tag "John Doe" 102a with sufficient confidence. For example, the models utilized the by the transitive relationship resolver 104a may indicate that while a probability of "J. Doe" and "John Doe" is high enough (e.g., based on predetermined thresholds, confidence levels, etc.) to indicate that "J. Doe" and "John Doe" may be related or refer to the same unit (e.g., the same customer name), the probabilities and/or confidence levels corresponding to the other associated data fields are not high enough (e.g., based on predetermine thresholds, confidence levels, etc.) to indicate that other data included in the transaction records respectively associated with "J. Doe" 102d and "John Doe" 102a are likely to be related or refer to the same unit. In such situations, the identification tag transformation module 104 may apply the reflective ID resolver 104b to the identification tag 4 (reference 102d) representing customer ID "J. Doe" and, in this scenario, may discover or determine that the identification tag 102d is transitively unrelated to every other identification tag in the set of identification tags 102. In response to this determination, the reflective ID resolver 104b may identify the identification tag 102d as being a reflective identification tag, and as such may sort the identification tag 102d into its own resolved ID tag set, e.g., into the reflective, resolved ID tag set 4 (reference 106d) that includes only the identification tag 102d. That is, as the identification tag 102d is a reflective identification tag, the identification tag 102d is the sole member of the reflective, resolved ID tag set 106d. Further, the reflective ID resolver 104b may generate and assign a unique identifier for the reflective, resolved ID tag set 106d, e.g., a unique identifier that uses the same syntax or format utilized by the unique identifier of the non-reflective, resolved ID tag set 106a. Alternately, in the situation where "J. Doe" 102d is determined by the transitive relationship resolver 104a and/or the reflective ID resolver 102b to be non-reflective ID tag, the ID tag 102d may be assigned to a non-reflective resolved ID tag set other than the non-reflective ID tag set 106a to which "John Doe" 102a was assigned.

In another example, the identification tag transformation module 104 may initially apply the reflective ID resolver 104b (instead of initially applying the transitive relationship resolver 104a) to a specific identification tag from the set 102, e.g., identification tag n (reference 102e), and as a result, the reflective ID resolver 104b may discover or determine that the specific identification tag 102e is transitively unrelated to every other identification tag included in the set of identification tags 102. For example, the reflective ID resolver 104b may, for the specific identification tag 102e, analyze and compare the identification tag 102e, associated data fields, and/or associated data field values and/or data contents with that of each of the other identification tags of the set 102 to discover or determine that identification tag 102e is a reflective ID tag. For example, the reflective ID resolver 104b may utilize pre-determined or learned data types and/or models to determine degrees of similarity and/or probabilities of relatedness between transaction records corresponding to the identification tag 102e and transaction records corresponding to the other identification tags included in the set 102, e.g., in a manner similar to those utilized by the transitive relationship resolver 104a. In this example, as the reflective ID resolver 104b has already determined that the specific identification tag 102e is transitively unrelated to every other identification tag included in the set of identification tags 102, the identification tag transformation module 104 may not subsequently apply the transitive relationship resolver 104a to the specific identification tag 102e. In this example, the identification tag transformation module 104 (e.g., via the reflective ID resolver 104b) may sort or otherwise designate the specific identification tag 102e to be a lone member of a specific, reflective resolved ID tag set, e.g., reflective, resolved ID tag set 106e, and the identification tag 102e need not be further compared with any other identification tag of the set 102.

Further, as illustrated in FIG. 1, the number of unique identification tags included in the set of identification tags 102 may range from 1 to n, and the number of unique resolved ID tag sets included in the set of resolved ID tag sets 106 may range from 1 to j, where n and j may not be equivalent. In other words, the identification tag transformation module 104 may transform the set 102 of n identification tags 102a-102e into a set 106 of j resolved ID tag sets 106a-106e, where j is less than n. Each resolved ID tag set included in the set 106 may be mutually exclusive to the every other resolved ID tag set included in the set 106 and, as a result, the number of resolved ID tag sets of the set 106 may be less than or, at most, equal to the number of identification tags of the set 102. Of course, it is to be understood that both n and j may be any suitable values, assuming that the number of resolved ID tag sets (e.g., the set of j resolved ID tag sets 106) does not exceed the number of original or initial identification tags (e.g., the set of n identification tags 102).

For example, assume that there are 5 identification tags included in the set of identification tags 102 (e.g., n=5). Further assume that identification tag 1 (reference 102a) is transitively related to identification tag 2 (reference 102b), that identification tag 3 (reference 102c) is transitively related to identification tag 4 (reference 102d), and that identification tag 5 (reference 102e) is transitively unrelated to each of identification tags 1-4 (references 102a-102d). In this scenario, the identification tag transformation module 104 may systematically evaluate each unique pair of identification tags by applying the transitive relationship resolver 104a to determine that identification tags 1 and 2 (references 102a, 102b) are transitively related, and that identification tags 3 and 4 (references 102c, 102d) are transitively related. The identification tag transformation module 104 may additionally apply the reflective ID resolver 104b to determine that identification tag 5 (reference 102e) is transitively unrelated to any of identification tags 1-4 (references 102a-102d). The transitive relationship resolver 104a may sort identification tags 1 and 2 (references 102a, 102b) into a first, non-reflective, resolved ID tag set (e.g., resolved ID tag set 1 or reference 106a), and may sort identification tags 3 and 4 (references 102c, 102d) into a second, non-reflective resolved ID tag set (e.g., resolved ID tag set 2 or reference 106b). The reflective ID resolver 104b may sort the identification tag 5 (reference 102e) into a third, reflective resolved ID tag set (e.g., resolved ID tag set 3 or reference 106c). Thus, in this example, the number of identification tags of the set 102 (e.g., 5) is greater than the number of resolved ID tag sets of the set 106 (e.g., 3).

Moreover, it is to be understood that each of the identification tags (e.g., 102a-102e) illustrated in FIG. 1 need not represent different customer IDs but may represent any type of unit, such as a customer transaction, a type of interaction, a type of procedure, etc., as described elsewhere herein. Further, in some implementations, at least some of the identification tags 102 may be obtained by the identification tag transformation module 104 in real-time as the transactions or other interactions are being completed (e.g., automatically obtained by the identification tag transformation module 104 upon filling of a prescription, approval of credit card, completion of a medical procedure, etc.), and/or at least some of the identification tags 102 may be obtained after their respective transactions or interactions have been completed and corresponding records have been respectively stored at local database(s) (e.g., on a local memory of a local store server connected to a network) for later retrieval by the identification tag transformation module 104. For example, the identification tag transformation module 104 may obtain one or more identification tags 102 in real-time, determine the fully resolved transitive relationships for each of the one or more identification tags in real-time, and sort each of the one or more identification tags into one of one or more mutually exclusive sets in real-time based upon the determination. Additionally or alternatively, the identification tag transformation module 104 may operate on at least some of the identification tags 102 in a batch, such as when two data sets are being merged.

In this manner, the identification tag transformation module 104 transforms the set of identification tags 102 from a randomly listed grouping of identification tags that are utilized across different databases and/or data sets into a comprehensive, well-organized, intuitive set of mutually exclusive resolved ID tag sets (e.g., set of resolved ID tag sets 106) that includes one or more non-reflective, resolved ID tag sets and/or includes one or more reflective, resolved ID tag sets, which conventional systems/techniques are unable to accomplish. For example, the identification tag transformation module 104 may designate each original identification tag 102 to be a member of one and only one of the resolved ID tag sets 106a-106e, whether reflective or non-reflective. Additionally, each mutually exclusive non-reflective resolved ID tag set may provide a comprehensive and complete set of equivalently and/or associatively transitively-related identification tags based on one or more identified data types (e.g., customer ID, customer name, customer address, transaction types, interaction types, procedure types, etc.). Thus, the identification tag transformation module 104 may more accurately and comprehensively track transaction records across multiple data sets when compared to conventional systems/techniques by identifying both reflective identification tags (e.g., via the reflective ID resolver 104b) as well as non-reflective identification tags (e.g., via the transitive relationship resolver 104a), thereby fully resolving identification tags across multiple data sets, and generally increasing the data quality of composite transaction records and the ability of entities to comprehensively identify all related/associated identification tags or units across the multiple data sets.

Additionally, the transitive relationship resolver 104a and the reflective ID resolver 104b introduce specific improvements to transaction record security and fidelity, and in particular, among composite transaction records and databases. Conventional systems are unable to accurately identify and/or transform reflective ID tags, resulting in, inter alia, transaction histories that fail to include single-interaction units (e.g., one-time purchase customers, single on-line account, single medical procedure patients, single registered class students, etc.). By contrast, the transitive relationship resolver 104a and reflective ID resolver 104b create transaction records that include both recurring and single-interaction units that enable enterprises and business entities to, for example, more accurately track unit interactions, identify potentially fraudulent interactions, reconcile information, and the like.

For example, assume that the identification transformation module 104 obtains a first ID tag included in the set of identification tags 102 that is associated with the customer ID "John Doe," and represents a purchase of a specific product at a pharmacy on an initial date. The reflective ID resolver 104b may discover that the first ID tag is transitively unrelated to every other identification tag included in the set of identification tags 102 and the set of resolved ID tag sets 106, and therefore may assign the first ID tag to a reflective, resolved ID tag set included in the set of resolved ID tag sets 106 as the lone member of the reflective, resolved ID tag set. Further, assume that at a subsequent date, the identification transformation module 104 obtains a second ID tag included in the set of identification tags 102 that is associated with the customer ID "John Doe," and represents a return of the specific product at the pharmacy on the subsequent date. The transitive relationship resolver 104a may discover that the second ID tag is transitively related to the first ID tag, and therefore may assign the second ID tag to the resolved ID tag set included in the set of resolved ID tag sets 106 that includes the first ID tag. As a result, the transitive relationship resolver 104a and the reflective ID resolver 104b maintain an accurate and secure record of John Doe's purchase and return transactions of the specific product at the pharmacy. Without the identification and assignment of the first ID tag by the reflective ID resolver 104b, any record of John Doe's purchase would be lost, such that any subsequent return by John Doe may be impossible. Conventional systems would be unable to identify John Doe's initial purchase because it was transitively unrelated to every other ID tag included in the set of resolved ID tag sets 106, and thus, conventional systems may improperly flag John Doe's subsequent return of the specific product as a stolen item or otherwise refuse to complete the return.

Further, fully resolving the transitive relationships between and among all obtained identification tags enables entities to more easily match payments from third parties (such as insurance companies or the like) to other data, such as accounts receivables at a store/pharmacy level. This ensures that payments of any kind (e.g., partial or full, one-time or recurring) can be readily tracked and managed in a manner that greatly reduces the chances of errors related to tracking of accounts, particularly for reflective identification tags that are often overlooked or otherwise misrepresented by conventional systems/techniques. Additionally, the unique identifiers applied to each mutually exclusive set by the transitive relationship resolver 104a and/or the reflective ID resolver 104b may reduce user confusion and enhance the results of the transformation by assigning unique identifiers that are independent of the identification tags being evaluated. These and other benefits and advantages over known systems/techniques are provided by the novel systems, methods, and techniques for increased overall transaction security and enhanced tracking accuracy for accounts described herein.

Figure 2:
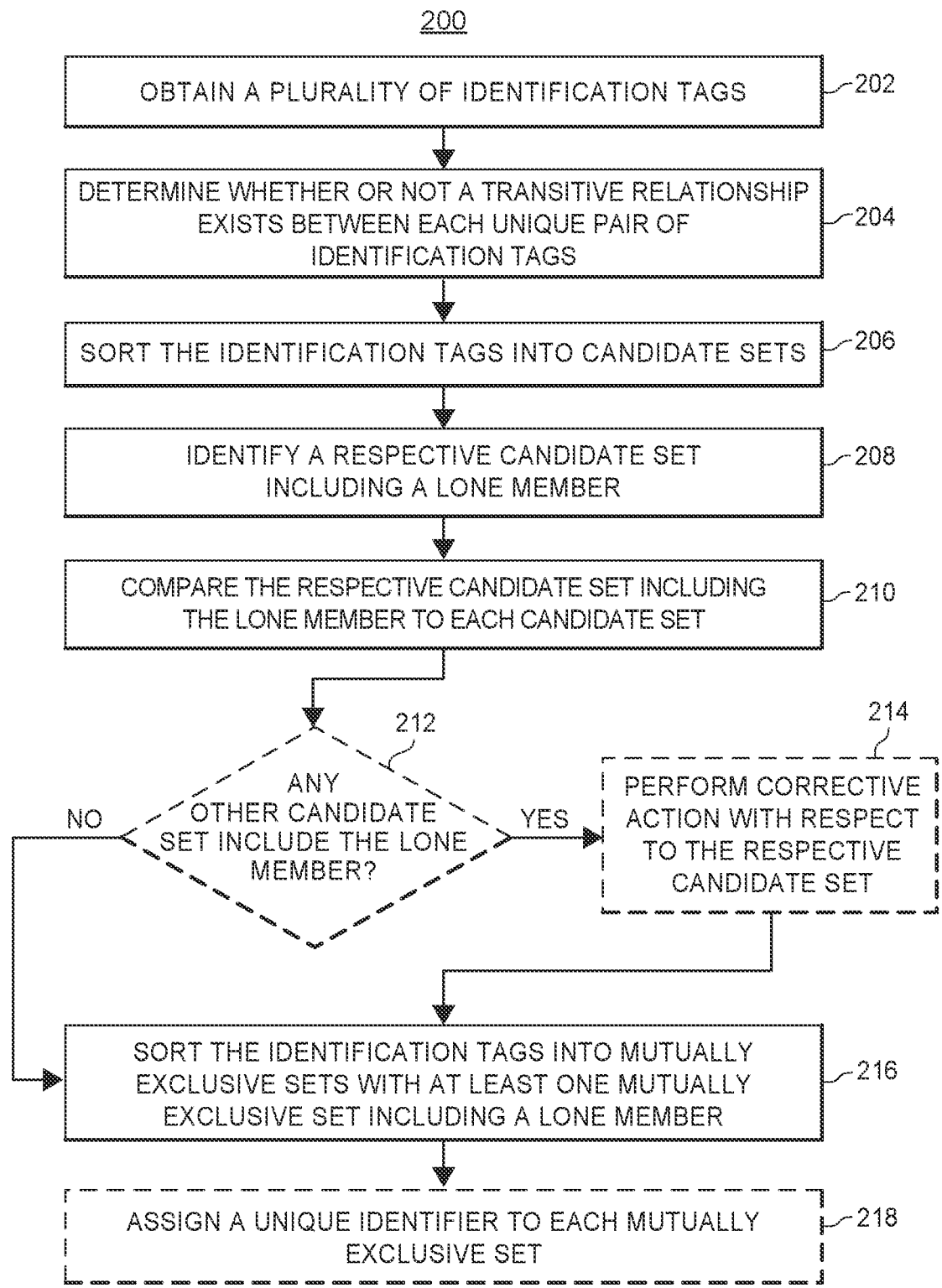
FIG. 2 illustrates a flow chart of an example method for resolving data relationships among multiple data sets.

FIG. 2 illustrates a flow chart of an example method 200 for resolving data relationships across a plurality of different data sets to provide increased overall security and fidelity of composite transaction records of the plurality of data sets, and to enhance the accuracy of tracking units (e.g., customer accounts, or other types of units) across the plurality of data sets. At least portions of the method 200 may be performed by utilizing the embodiments of the identification tag transformation module 104, the transitive relationship resolver 104*a*, and/or the reflective ID resolver 104*b* of FIG. 1, for example, or by other suitable modules or systems. In embodiments, the method 200 may include additional or alternate steps other than those described herein.

The method 200 may include obtaining a plurality of identification tags (block 202), which may be referred to herein as an "original" or "initial" plurality of identification tags. For example, at least some of the plurality of identification tags may be obtained 202, e.g., in response to (e.g., in-line or in real time with respect to) one or more customer/entity purchases, communications, and/or other interactions. Additionally or alternatively, at least some of the plurality of identification tags may be obtained from a plurality of data sets, databases, files, and/or from various servers and/or computing devices. The plurality of identification tags may identify or otherwise correspond to various units, such as customer identifications, customer accounts, transaction types, and/or other types of units. For example, the plurality of identification tags that are obtained 202 may be similar to the set of identification tags 102 of FIG. 1.

At a block 204, the method 200 may include determining whether or not a transitive relationship exists between each unique pair of identification tags of the obtained identification tags. In an embodiment, the block 204 may include analyzing each possible unique pair of identification tags included in the plurality of identification tags to fully resolve the transitive relationships (e.g., equivalent transitive relationships and associated transitive relationships) of each identification tag included in the plurality of identification tags. In an embodiment, the block 204 may include comparing one or more identification tags, data fields, data field values, data strings, and/or other data content included in and/or associated with each identification tag of each unique pair of identification tags to identify or discover any correlations, matches, and/or other similarities between the pair. In an embodiment, the block 204 may include utilizing one or more trained models to determine a likelihood or probability of the compared identification tags, data fields, data field values, data strings, and/or other data content being related or referring to a same unit, and optionally comparing the likelihood to one or more corresponding thresholds or other confidence metrics.

In various embodiments, the one or more trained models utilized at the block 204 (and/or utilized by the identification tag transformation module 104 of FIG. 1, for that matter) may include an artificial intelligence (AI) based or machine learning model trained with at least one AI algorithm. Training of a model that is utilized by the method 200 and/or is included in the identification tag transformation module 104 may involve analysis of training data sets (e.g., training identification tags) to configure weights of the model and its underlying algorithm (e.g., machine learning or artificial intelligence algorithm) that is used to predict and/or determine future transitive relationships between obtained identification tags. For example, training the model utilized by the method 200 and/or by the identification tag transformation module 104 may include training the model by using a plurality of training data sets of a plurality of identification tags, where each of the identification tags is associated, within the plurality of training data sets, with respective data fields, data field values, data strings, and/or data content. In some embodiments, one or more processors of one or more servers or a cloud-based computing platform may receive the plurality of training data sets of the plurality of identification tags via a computer network. In such embodiments, the server(s) and/or the cloud-based computing platform may train the model to determine the subset of data fields, data field values, data strings, and/or data content that are most likely to be associated with particular identification tags and/or with related pairs of identification tags, and respective weightings indicative of relative influence, e.g., as compared to other data fields, data field values, data strings, and/or data content included in the training data sets.

In various embodiments, a machine learning imaging model, as described herein (e.g., a model included in the identification tag transformation module 104 and/or utilized by the method 200), may be trained using a supervised or unsupervised machine learning program or algorithm. The machine learning program or algorithm may employ a neural network, which may be a convolutional neural network, a deep learning neural network, a combined learning module or program that learns in two or more features or feature datasets (e.g., identification tag data) in a particular areas of interest, and/or any other types of machine learning techniques. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques, for example. In some embodiments, the artificial intelligence and/or machine learning based algorithms may be included as a library or package executed on resolution server(s) 102. For example, libraries may include the TENSORFLOW based library, the PYTORCH library, and/or the SCIKIT-LEARN Python library.

Machine learning may involve identifying and recognizing patterns in existing data (such as training a model based on identification tag data within training data sets having data types including, for instance, customer IDs, transaction type IDs, timestamps, etc.) in order to facilitate making predictions or identification for subsequent data (such as using the model on new identification tag data of a new transaction record in order to determine whether or not a transitive relationship exists between the new identification tag data and at least one other identification tag).

Machine learning model(s), such as the model utilized by the method 200 (e.g., at the block 204) and/or by the identification tag transformation module 104, may be created and trained based upon example data (e.g., "training data" and related identification tag data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

Returning now to the method 200, the method 200 may include one or more of the optional blocks 206-214. At the block 206, the method 200 may include sorting or otherwise grouping the initial plurality of identification tags into candidate sets. Generally speaking, the candidate sets may represent temporary assignments of the plurality of identification tags into various working sets whose membership may change over time prior to finalizing the resolved ID tag sets (e.g. resolved ID tag sets 106a-106e), where the finalized, resolved ID tag sets are mutually exclusive sets of ID tags. When the identification tag transformation module 104 confirms that each of the candidate sets includes identification tags that are exclusively transitively related (e.g., are transitively related to only the other identification tags included in the respective candidate set, if any), and that all of the originally obtained identification tags have been assigned to candidate sets, then the identification tag transformation module 104 may determine that the candidate sets are mutually exclusive sets, and the resolution of data between the initial plurality of ID tags has been fully resolved. When the candidates sets have been fully resolved, the candidate sets are considered to be the finalized, resolved tag sets (e.g., resolved ID tag sets 106a-106e).

To illustrate, consider an example scenario in which the obtained plurality of identification tags includes six unique identification tags. In this scenario, identification tags 1-3 are transitively related, identification tags 4 and 5 are transitively related, and identification tag 6 is a reflective identification tag; however, these transitive relationships are not known by the identification tag transformation module 104 a priori. The identification tag transformation module 104 initially applies the transitive relationship resolver 104a to the six obtained identification tags, and the transitive relationship resolver 104a may initially incorrectly determine that identification tag 6 is transitively related to one or more of identification tags 1-3 as well as to one or more of identification tags 4 and 5, for example, based upon data which had been erroneously stored in the transaction record of identification tag 6. Thus, in this example scenario, at the block 206, all six identification sets are (incorrectly) sorted into a same candidate set (e.g., candidate set "A") as a result of the erroneous data of identification tag 6.

Subsequently in the example scenario, the identification transformation tag module 104 may apply the reflective ID resolver 104b to at least some of the obtained identification tags 1-6. In doing so, the reflective ID resolver 104b sorts or assigns identification tag 6 into a reflective candidate set by itself, e.g., candidate set "B" (block 208). That is, at the block 208, candidate set B includes a lone member, e.g., identification tag 6. Consequently, at this point in the example scenario, the method 200 has sorted two candidate sets which are not mutually exclusive, as both candidate set A and candidate set B include identification tag 6.

At block 210, and referring to the above example, the method 200 may include comparing the candidate set having the lone member (e.g., candidate set B) to each other candidate set (e.g., candidate set A). Generally, the identification tag transformation module 104 or other processor(s) may compare candidate set A to candidate set B as a precautionary measure, upon detection of erroneous data entry, and/or as a routine check performed by the identification tag transformation module 104 as part of the determinations made by the identification tag transformation module 104. More specifically, the reflective ID resolver 104b may compare each respective candidate set that has a lone member (e.g., candidate set B) against every other candidate set (e.g., candidate set A). The comparison may include, for example, the reflective ID resolver 104b comparing one or more data strings of the lone member (e.g., of candidate set B) against one or more data strings of each identification tag included in each other candidate set (e.g., candidate set A).

At block 212, the method 200 may include determining whether any other candidate set includes the lone member of the respective candidate set. Continuing the above example, the reflective ID resolver 104b may compare the candidate set A and the candidate set B and determine that the candidate set A includes identification tag 6, which is the lone member of candidate set B. Thus, the reflective ID resolver 104b may continue along the YES branch of block 212 to block 214, where the reflective ID resolver 104b may perform one or more corrective actions with respect to one or both candidate sets (e.g., candidate set A and/or candidate set B). For example, as previously mentioned, a respective identification tag may occasionally be determined to be both a reflective identification tag (e.g., a lone member) and a non-reflective identification tag when the data strings included in the respective identification tag contain incorrect, incomplete, or otherwise erratic information. In some of these situations, identification tags that are obtained by the identification tag transformation module 104 (e.g., the set of identification tags 102) may in actuality have a transitive relationship to at least one other identification tag already included in the identification tag sets (e.g., the set of resolved ID tag sets 106). For example, a customer creates a transaction record each time the customer performs some interaction via a respective service avenue of the enterprise (e.g., in-store purchase, on-line account registration, mobile application purchase, etc.), each of which may be transitively related because they all contain the same customer ID string. It is therefore generally less likely that an identification tag which is included in both a candidate set as a lone member and in another candidate set of related identification tags is actually a lone member, and the method 200 may utilize one or more models and their corresponding measures of correlations (e.g., in a manner similar to that discussed above) to determine that the respective likelihood that the two duplicate identifications tags refer to a same unit is indeed above a threshold and/or has a high confidence level. As a result, the corrective action may include deleting the respective candidate set consisting of the lone member when the reflective ID resolver 104b determines that at least one other candidate set includes the alleged lone member with sufficiently high confidence. However, in other scenarios, the corrective action may include removing the lone member from the non-reflective candidate set, or any other similar action. For instance, in the above example, the reflective ID resolver 104b may perform a corrective action with respect to candidate set A by removing identification tag 6 from candidate set A because identification tag 6 was erroneously included in candidate set A due to corresponding erroneous data.

At block 216, the method 200 may include further (re)sorting and/or (re)assigning at least some of the plurality of identification tags (e.g., by recursively repeating at least some of the blocks 204-216) until one or more mutually exclusive sets of related identification tags (e.g., the set of resolved ID tag sets 106) is achieved. For some identification tags, e.g., when no other candidate set includes a lone member consisting of the subject identification tag (e.g., the NO branch of block 212), then the identification tag transformation module 104 may proceed directly to block 216 to directly sort the lone member into its own reflective, resolved ID tag set, and may omit the sorted lone member from any subsequent (re)sorting and/or (re)assigning. In any event, at least one mutually exclusive set may each include a respective lone member, where the respective lone member is a respective reflective identification tag. Continuing the above example, the identification tag transformation module 104 may eventually sort (e.g., via recursion) identification tags 1-3 into a first mutually exclusive set, identification tags 4 and 5 into a second mutually exclusive set, and identification tag 6 into a third mutually exclusive set. Generally, the identification tag transformation module 104 may include each of the one or more mutually exclusive sets in individual and/or shared files on, for example, a unit database. The one or more mutually exclusive sets may then be utilized in any relevant post-processing analysis including, for example, tracking a purchase history for individual customers or for an individual store/region, comparisons of payment receipts from insurance companies with accounts receivables for an individual customer/store/region, etc.

In various embodiments, during recursion and/or repeated executions of at least some of the blocks 204-216, the identification tag transformation module 104 sorts (and optionally re-sorts) the plurality of identification tags into one or more working or candidate sets of identification tags. In reference to the above example, assume that the identification tag transformation module 104 has correctly sorted tags 1-3 into a first candidate set, tags 4-5 into a second candidate set, and tag 6 into a third candidate set. Additionally, the identification transformation tag module 104 has sorted identification tags 7 and 8 into a fourth candidate set which excludes tags 1-3, and identification tags 9 and 10 into a fifth candidate set which excludes tags 4 and 5. At some point during the (re)sorting process (e.g., during a recursive repetition of at least one of the blocks 204-216), the identification tag transformation module 104 may identify that a transitive relationship exists between at least one of identification tags 1-3 and at least one of identification tags 7 and 8, and that a transitive relationship exists between at least one of identification tags 4 and 5 and at least one of identification tags 9 and 10. Accordingly, the identification tag transformation module 104 may re-sort or reassign each of identification tags 1-3, 7, and 8 into either the first or the fourth candidate set, and each of identification tags 4, 5, 9, and 10 into either the second or the fifth candidate set.

In various embodiments, and responsive to determining that a respective identification tag is transitively unrelated to every other identification tag in the plurality of identification tags, the identification tag transformation module 104 (e.g., the reflective ID resolver 104b) may identify the respective identification tag as the respective lone member of a candidate set. In reference to the prior example, the reflective ID resolver 104b identifies that identification tag 6 was transitively unrelated to each of identification tags 1-5, and as a result, identifies identification tag 6 as a lone member, e.g., of its own candidate set. Further in these embodiments, sorting the plurality of identification tags into the one or more mutually exclusive sets is further based on the identification of the respective identification tag as the respective lone member. Furthering the previous example, the identification tag transformation module 104 may sort the identification tag 6 into the third, reflective mutually exclusive set because identification tag 6 was a lone member of its candidate set, e.g., across multiple recursions and/or repetitions of at least portions of the method 200.

In various embodiments, and as described herein, subsequent to determining the set of resolved, ID tag sets 106, the identification tag transformation module 104 may obtain an indication of a removal of a particular identification tag, such as when one or more of the plurality of data sets is modified or updated, when errors are discovered and mitigated, etc. In these embodiments, the identification tag transformation module 104 may remove the particular identification tag from a respective mutually exclusive set of respectively related identification tags. Moreover, in some scenarios, responsive to the removing, the identification tag transformation module 104 may divide the respective mutually exclusive set (from which the particular identification tag was removed) into one or more mutually exclusive subsets, each including one or more identification tags of respectively related identification tags. A more detailed discussion of this scenario is discussed in the "split" scenario illustrated in the example identification tag sorting 306 of FIG. 3.

In various embodiments, and as described herein, subsequent to determining the set of resolved, ID tag sets 106, the identification tag transformation module 104 may obtain a new identification tag, such as when one or more of the plurality of data sets is updated with a new transaction record. In these embodiments, the identification tag transformation module 104 may determine whether or not a transitive relationship exists between the new identification tag and at least one identification tag from each of the one or more mutually exclusive sets of related identification tags 106. The identification tag transformation module 104 may further sort the new identification tag into a respective mutually exclusive set based on the determination. In further variations of these embodiments, the new identification tag may be transitively related to a respective identification tag in each of two or more of the plurality of mutually exclusive sets. In these further variations, the identification tag transformation module 104 may concatenate or otherwise form a union of the two or more of the plurality of mutually exclusive sets into a single, resolved ID tag set of which the new identification tag is a member. A more detailed discussion of this scenario is discussed in the "merge" scenario illustrated in the example identification tag sorting 312 of FIG. 3.

Returning to the method 200, at optional block 218, the method 200 may include assigning a unique identifier to each mutually exclusive set of the one or more mutually exclusive sets (e.g., of the set of resolved ID tag sets 106). The unique identifier for each respective mutually exclusive set may be configured to represent the entire respective mutually exclusive set (e.g., a resolved ID tag set "name"). Moreover, the unique identifier for each respective mutually exclusive set may be based on each of the identification tags included in the respective mutually exclusive set. For example, the identification tag transformation module 104 may sort the one or more mutually exclusive sets (e.g., the sets of resolved ID tags 106a-106e) into a sequential order based on the respective identification tags included in each mutually exclusive set of the one or more mutually exclusive sets. The unique identifier of the each mutually exclusive set of the one or more mutually exclusive sets may be based on a relative position of the each mutually exclusive set within the sequential order. Further, in some implementations, the identification tag transformation module 104 may sort each mutually exclusive set of the one or more mutually exclusive sets into two data sections, a first data section including the unique identifier and a second data section including each identification tag of the respective identification tags included in the each mutually exclusive set. The first primary data section may include the unique identifier, and the second primary data section may include each of the related identification tags included in the respective mutually exclusive set. In certain embodiments, the first primary data section may be a first primary data column, and the second primary data section may be a second primary data column.

To illustrate, assume that the identification tag transformation module 104 fully resolves six identification tags into three mutually exclusive sets of related identification tags (e.g., three sets in the set of resolved ID tag sets 106). Further assume that the first mutually exclusive set includes identification tags 1-3, that the second mutually exclusive set includes identification tags 4-5, and that the third mutually exclusive set includes identification tag 6. Finally, assume that the first, second, and third mutually exclusive sets were randomly ordered as such. The identification tag transformation module 104 may evaluate/analyze the identification tags, including individual data strings contained therein, included in each of the first, second, and third mutually exclusive sets to determine whether or not to reorder the mutually exclusive sets. The identification tag transformation module 104 may, for example, be configured to sequentially order the mutually exclusive sets based upon the number of identification tags included therein, where mutually exclusive sets with fewer identification tags are included earlier in the sequential ordering. Thus, the identification tag transformation module 104 may rearrange the first, second, and third mutually exclusive sets by placing the third mutually exclusive set in the first position of the sequential ordering, maintaining the second mutually exclusive set in the second position of the sequential ordering, and placing the first mutually exclusive set in the third position of the sequential ordering. Accordingly, the identification tag transformation module 104 may assign the third mutually exclusive set a unique identifier based upon its first position in the sequential ordering, assign the second mutually exclusive set a unique identifier based upon its second position in the sequential ordering, and assign the first mutually exclusive set a unique identifier based upon its third position in the sequential ordering. Of course, it is to be understood that the identification tag transformation module 104 may be configured to sort the one or more mutually exclusive sets into the sequential order based upon any suitable aspect of the respective identification tags included in each mutually exclusive set of the one or more mutually exclusive sets.

It is understood that at least portions of the method 200 may be performed in a recursive manner (and in some cases, with multiple recursions) to more fully resolve the transitive relationships between and among the plurality of obtained identification tags, as described herein. Moreover, it will be appreciated that the actions recited above and herein may be performed in any order and/or any number of times to achieve a desired result.

Figure 3:
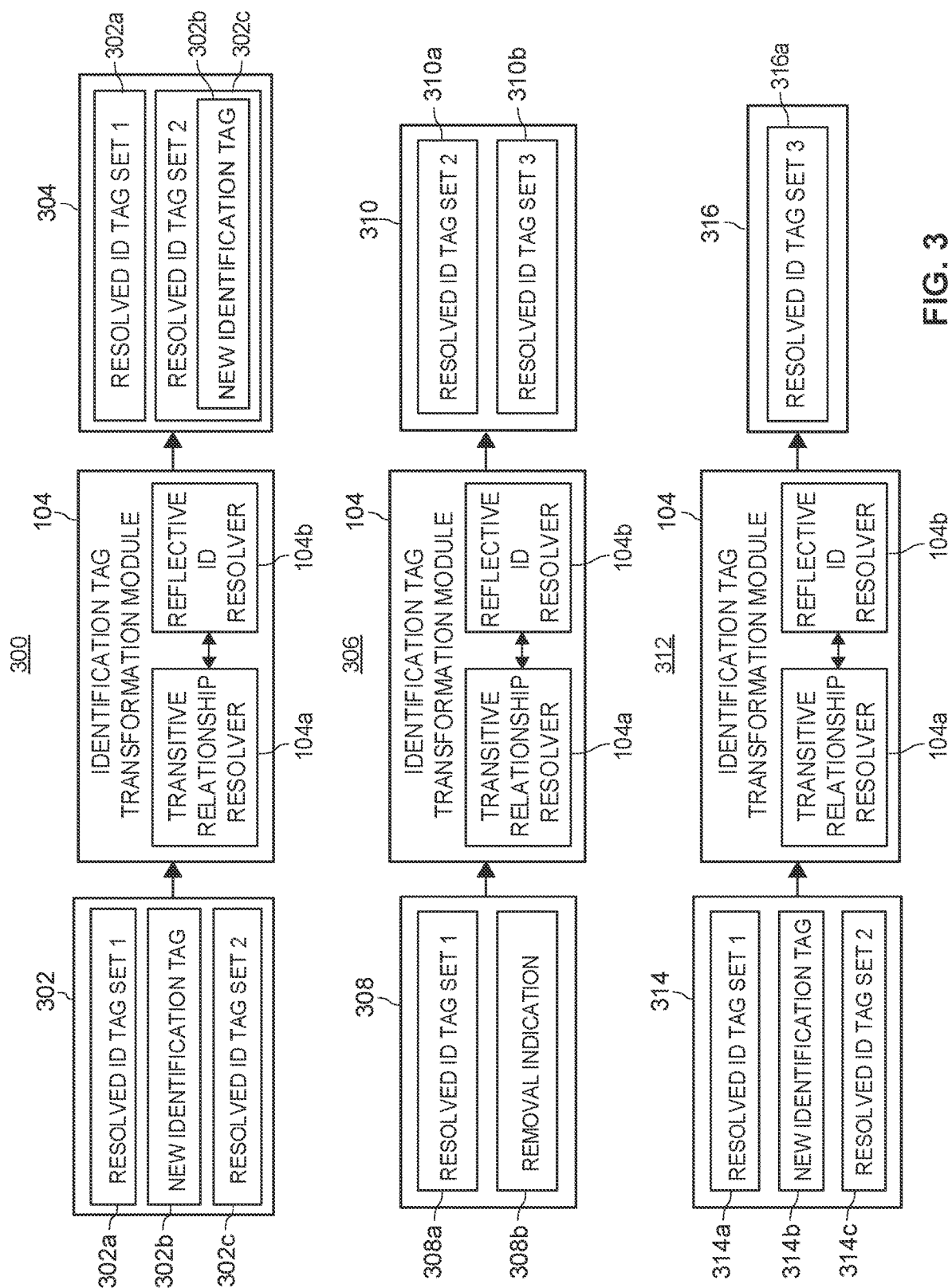
FIG. 3 illustrates a variety of example test cases for resolving data relationships among data sets, e.g., to determine a completeness and/or a comprehensiveness of resolved relationships.

FIG. 3 illustrates a variety of example test cases 300, 306, 312 for resolving relationships among a plurality of data sets to provide increased overall transaction security and to enhance the tracking accuracy for accounts and/or other types of units. Any one or more of the test cases 300, 306, 312 may be applied to one or more candidate sets and/or to one or more of the resolved ID tag sets, such as any one of the resolved ID tag sets 106a-106e and/or candidate sets discussed with respect to FIG. 1, for example. Additionally or alternatively, any one or more of the test cases 300, 306, 312 may be applied in conjunction with at least portions of the method 200, in embodiments. Generally speaking, the results of the identification tag transformation module 104 transforming the one or more identification tags into one or more mutually exclusive sets of resolved ID tags (e.g., into the set of resolved ID tag sets 106) and/or the execution of the method 200 can take a variety of forms. As new identification tags and/or identification tag removal indications are obtained by the identification tag transformation module 104 and analyzed (e.g., via the application of the reflective ID resolver 104b and/or the transitive relationship resolver 104a to the new identification tags and/or removal indications), the transitive relationships of identification tags included in one or more of the mutually exclusive sets of resolved ID tags may change accordingly, and therefore the sets of resolved ID tags may also change.

For example, the example identification tag sorting 300 illustrates a scenario in which a set of inputs 302, including a resolved ID tag set 1 (reference 302a), a new identification tag 302b, and a resolved ID tag set 2 (reference 302c), is transformed by the identification tag transformation module 104. In an example application, the identification tag sorting 300 may take place, for example, when a patient authorizes a co-pay for a visit to their primary care provider, when a student provides on-line course selections for a subsequent school semester, when a customer purchases a prescription refill at their local pharmacy, or the like. The identification tag transformation module 104 may transform the set of inputs 302 by, at least in part, applying the transitive relationship resolver 104a to the new identification tag 302b to fully resolve any transitive relationships the new identification tag 302b may have relative to one or more identification tags included in one or both of the resolved ID tag set 1 (reference 302a) and the resolved ID tag set 2 (reference 302c). The transitive relationship resolver 104a may determine that the new identification tag 302b is transitively related to one or more identification tags included in the resolved ID tag set 2 (reference 302c), for instance. Furthering the above examples, the resolved ID tag set 2 (reference 302c) may include, for example, identification tags indicating the patient authorizing a co-pay for a previous visit to their primary care provider, the student providing on-line course selections for a prior school semester, the customer purchasing an initial fill of the prescription at their local pharmacy, or the like. As a result, the identification tag transformation module 104 may sort the new identification tag 302b into the resolved ID tag set 2 (reference 302c), and the identification tag transformation module 104 may leave the resolved ID tag set 1 (reference 302a) unaltered. Accordingly, the transformation performed by the identification tag transformation module 104 to the set of inputs 302 may result in a corresponding set of outputs 304, featuring the unaltered resolved ID tag set 1 (reference 302a) and the resolved ID tag set 2 (reference 302c), where the resolved ID tag set 2 (reference 302c) includes the recently added new identification tag 302b.

In this manner, a user or operator may test the identification tag transformation module 104, and more particularly, the transitive relationship resolver 104a, to determine whether the one or more data types (e.g., customer ID strings, transaction type strings, timestamps, etc.) selected to parameterize the analysis of the transitive relationship resolver 104a are sufficient to accurately and fully resolve the transitive relationships between and among the obtained identification tags (e.g., the set of identification tags 102). As an example, during testing, assume that a user/operator is aware a priori that the new identification tag 302*b* is transitively related to at least one identification tag included in the resolved ID tag set 2 (reference 302*c*), and is transitively unrelated to each identification tag included in the resolved ID tag set 1 (reference 302*a*). As such, during testing, if the transitive relationship resolver 104*a* incorrectly sorts the new identification tag 302*b* into the resolved ID tag set 1 (reference 302*a*), then the user/operator may determine that one or more of the one or more data types currently selected is causing the transitive relationship resolver 104*a* to incorrectly sort the new identification tag 302*b* and needs to be adjusted to re-parameterize the analysis performed by the transitive relationship resolver 104*a*.

As another example, the example identification tag sorting 306 illustrates a scenario in which a set of inputs 308, including a resolved ID tag set 1 (reference 308*a*) and a removal indication 308*b*, is transformed by the identification tag transformation module 104. This example identification tag sorting 306 may take place when a user or operator removes, deletes, and/or otherwise alters an identification tag or an identification tag set. To illustrate, a user or operator may recognize that an identification tag present in the resolved ID tag set 1 (reference 308*a*) is an erratic entry that should be removed from the resolved ID tag set 1 (reference 308*a*). The user or operator may queue the erratic entry for deletion, the result of which may be the removal indication 308*b* obtained by the identification tag transformation module 104, and thereby instructing the identification tag transformation module 104 to remove the erratic or irrelevant entry from the resolved ID tag set 1 (reference 308*a*). In an example application, the resolved ID tag set 1 (reference 308*a*) may represent all visits to a primary care physician that have occurred within the previous six months. One or more ID tags included in the resolved ID tag set 1 (reference 308*a*) may include a timestamp indicating the respective visit occurred six months and one day from the current date, and as a result, a user/operator may manually enter and/or the server or other processor(s) may automatically generate the removal indication 308*b* to remove the outdated one or more ID tags from the resolved ID tag set 1 (reference 308*a*).

In the example identification tag sorting 306, the identification tag transformation module 104 may obtain the resolved ID tag set 1 (reference 308*a*) and the removal indication 308*b*, and may apply the transitive relationship resolver 104*a* and/or the reflective ID resolver 104*b* to both the resolved ID tag set 1 (reference 308*a*) and the removal indication 308*b*. The transitive relationship resolver 104*a* and/or the reflective ID resolver 104*b* may interpret the removal indication 308*b* (e.g., by parsing the instructions included therein) and thereby remove the erratic or otherwise transitively unrelated entry from the resolved ID tag set 1 (reference 308*a*). The transitive relationship resolver 104*a* and/or the reflective ID resolver 104*b* may then re-evaluate the transitive relationships between each unique pair of identification tags included in the resolved ID tag set 1 (reference 308*a*) and, in an example outcome, determine that the remaining identification tags include two different sets of transitively related identification tags. As a result, the identification tag transformation module 104 may generate a set of outputs 310 by sorting the remaining identification tags from the resolved ID tag set 1 (reference 308*a*) into a resolved ID tag set 2 (reference 310*a*) and a resolved ID tag set 3 (reference 310*b*), where the sets 310*a*, 310*b* are mutually exclusive subsets of the previous set 308*a*. Thus, the resolved ID tag set 2 (reference 310*a*) may include a first subset of the remaining identification tags previously included in the resolved ID tag set 1 (reference 308*a*), and the resolved ID tag set 3 (reference 310*b*) may include a second subset of the remaining identification tags previously included in the resolved ID tag set 1 (reference 308*a*) that is mutually exclusive from the first subset 310*a*. The scenario illustrated by the example identification tag sorting 306 may be referenced herein as a "split" of identification tag sets.

In this manner, a user or operator may test the identification tag transformation module 104, and more particularly, the transitive relationship resolver 104*a* and/or the reflective ID resolver 104*b*, to determine whether the one or more data types (e.g., customer ID strings, transaction type strings, timestamps, etc.) selected to parameterize the analysis of the transitive relationship resolver 104*a* and/or the reflective ID resolver 104*b* are sufficient to accurately resolve the transitive relationships between obtained identification tags. As an example, during testing, assume that a user/operator is aware a priori that removing the one or more ID tags indicated in the removal indication 308*b* would result in the split of the resolved ID tag set 1 (reference 308*a*) into the resolved ID tag set 2 (reference 310*a*) and the resolved ID tag set 3 (reference 310*b*). However, if, during testing, the identification tag transformation module 104 obtains the removal indication 308*b*, removes the one or more ID tags from the resolved ID tag set 1 (reference 308*a*), and incorrectly sorts the remaining identification tags into a single identification tag set, then the user/operator may determine that one or more one or more data types should be adjusted to re-parameterize the analysis performed by the identification tag transformation module 104.

As yet another example, the example identification tag sorting 312 illustrates a scenario where a set of inputs 314 (e.g., a resolved ID tag set 1 (reference 314*a*), a new identification tag (reference 314*b*), and a resolved ID tag set 2 (reference 314*c*)) is transformed by the identification tag transformation module 104. This example identification tag sorting 312 may take place when the new identification tag 314*b* is obtained by the identification tag transformation module 104 for inclusion into one of the mutually exclusive set of related identification tags (e.g., the set of resolved ID tag sets 106). To illustrate using an example application, a customer may purchase an item, service, etc. from a business entity hosting a server that stores and operates the identification tag transformation module 104. The purchase may create a new transaction record, as described herein, and may further be recorded as the new identification tag 314*b*.

In this example identification tag sorting 312, the identification tag transformation module 104 may apply the transitive relationship resolver 104*a* and/or the reflective ID resolver 104*b* to each of the resolved ID tag set 1 (reference 314*a*), the new identification tag 314*b*, and the resolved ID tag set 2 (reference 314*c*). The transitive relationship resolver 104*a* and/or the reflective ID resolver 104*b* may then re-evaluate the transitive relationships between each unique pair of identification tags included in the resolved ID tag set 1 (reference 314*a*), the new identification tag 314*b*, and the resolved ID tag set 2 (reference 314*c*) and determine that the new identification tag 314*b* is transitively related to at least one identification tag included in the resolved ID tag set 1 (reference 314*a*) and at least one identification tag included in the resolved ID tag set 2 (reference 314*c*). As a result, the identification tag transformation module 104 may generate a set of outputs 316 by sorting each of the identification tags included in the resolved ID tag set 1 (reference 314*a*), the new identification tag 314*b*, and the resolved ID tag set 2 (reference 314*c*) into a resolved tag set 3 (reference 316*a*). The scenario illustrated by the example identification tag sorting 312 may be referenced herein as a "merge" of identification tag sets 314a and 314c (as well as new tag 314b) into merged set 316a.

In this manner, a user or operator may test the identification tag transformation module 104, and more particularly, the transitive relationship resolver 104a and/or the reflective ID resolver 104b, to determine whether the one or more data types (e.g., customer ID strings, transaction type strings, timestamps, etc.) selected to parameterize the analysis of the transitive relationship resolver 104a and/or the reflective ID resolver 104b are sufficient to accurately resolve the transitive relationships between obtained identification tags. As an example, during testing, assume that a user/operator is aware a priori that obtaining and fully resolving the transitive relationships of the new identification tag 314b would result in the merge of the resolved ID tag set 1 (reference 314a) with the resolved ID tag set 2 (reference 314c). Consequently, if, during testing, the identification tag transformation module 104 obtains the new identification tag 314b, and the reflective ID resolver 104b discovers that the new identification tag 314b is transitively unrelated to every other identification tag included in both the resolved ID tag set 1 (reference 314a) and the resolved ID tag set 2 (reference 314c), then the user/operator may determine that one or more one or more data types should be adjusted to re-parameterize the analysis performed by the reflective ID resolver 104b.

Of course, any of the aspects and/or techniques described with respect to the example identification tag sorting techniques 300, 306, 312 are not only limited to testing scenarios, and may be utilized during non-testing scenarios, e.g., to sort or re-sort identification tags, such as during the execution of the method 200, or at any time by the identification tag transformation module 104 and related systems. Further, although the above testing scenarios are described as being performed, supervised, or monitored by a user or operator, it is understood that any of the aspects and/or techniques discussed with respect to FIG. 3 may be automatically performed, e.g., without any user input, action, monitoring, instruction, etc.

Figure 4:
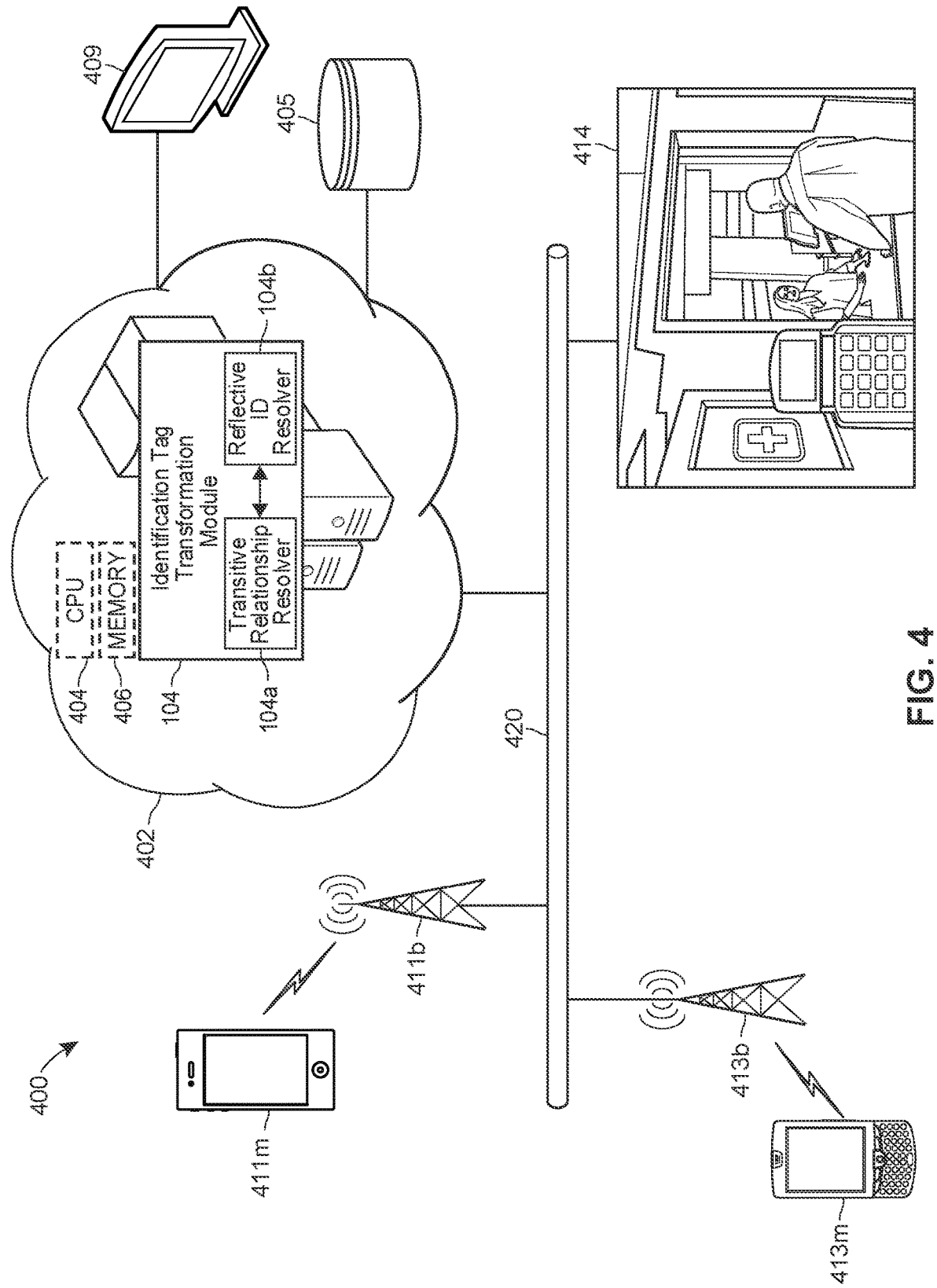
FIG. 4 depicts an embodiment of a system for resolving data relationships among data sets to provide increased overall security and fidelity of transaction records, and to enhance the accuracy of tracking accounts or data associated with units.

FIG. 4 depicts an embodiment of an example resolution system 400 for resolving relationships within data sets to provide increased overall security and fidelity of transaction records, and to enhance the accuracy of tracking accounts or units, e.g., in composite data transactions and/or composite databases. In the example embodiment of FIG. 4, the example resolution system 400 includes one or more servers 402, which may comprise one or more computer servers. In various embodiments, server(s) 402 comprise multiple servers, which may comprise a multiple, redundant, or replicated servers as part of a server farm. In still further embodiments, server(s) 402 may be implemented as cloud-based servers, such as a cloud-based computing platform. For example, server(s) 402 may be any one or more cloud-based platform(s) such as MICROSOFT AZURE, AMAZON AWS, or the like. Server(s) 402 may include one or more processor(s) 404 as well as one or more computer memories 406. Server(s) 402 may be referred to herein as "resolution server(s)."

The memories 406 may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memorie(s) 406 may store an operating system (OS) (e.g., Microsoft Windows, Linux, Unix, etc.) capable of facilitating the functionalities, applications, methods, or other software as discussed herein.

The memorie(s) 406 may also store the identification tag transformation module 104. Additionally, or alternatively, the identification tag transformation module 104 may also be stored in database 405, which is accessible or otherwise communicatively coupled to resolution server(s) 402, and/or in the memorie(s) of one or more user computing devices 411m and/or 413m. Generally speaking, the identification tag transformation module 104 may include computer-executable instructions that are executable by the processor(s) to provide any of the features, aspects, and/or techniques described elsewhere herein with respect to the identification tag transformation module 104, the transitive relationship resolver 104a, and/or the reflective ID resolver 104b. For example, the identification tag transformation module 104 may include one or more models, correlation thresholds, confidence intervals, etc. that are utilized by the identification tag transformation module 104, the transitive relationship resolver 104a, and/or the reflective ID resolver 104b. The memories 406 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of, a machine learning model or component, such as the identification tag transformation module 104, the method 200, the test cases 300, 306, 312, etc., where each may be configured to facilitate their various functionalities discussed herein. It should be appreciated that one or more other applications may be envisioned and that are executed by the processor(s) 404.

The processor(s) 404 may be connected to the memories 406 via a computer bus responsible for transmitting electronic data, data packets, or otherwise electronic signals to and from the processor(s) 404 and memories 406 in order to implement or perform the machine readable instructions, methods, processes, elements or limitations, as illustrated, depicted, or described for the various flowcharts, illustrations, diagrams, figures, and/or other disclosure herein.

The processor(s) 404 may interface with the memory 406 via the computer bus to execute the operating system (OS). The processor(s) 404 may also interface with the memory 406 via the computer bus to create, read, update, delete, or otherwise access or interact with the data stored in the memories 406 and/or the database 405 (e.g., a relational database, such as Oracle, DB2, MySQL, or a NoSQL based database, such as MongoDB). The data stored in the memories 406 and/or the database 405 may include all or part of any of the data or information described herein, including, for example, transaction records and/or training data sets or other information of customers, business entities, and/or any other entity.

The resolution server(s) 402 may further include a communication component configured to communicate (e.g., send and receive) data via one or more external/network port(s) to one or more networks or local terminals, such as computer network 420 and/or terminal 409 (for rendering or visualizing) described herein. In some embodiments, resolution server(s) 402 may include a client-server platform technology such as ASP.NET, Java J2EE, Ruby on Rails, Node.js, a web service or online API, responsive for receiving and responding to electronic requests. The resolution server(s) 402 may implement the client-server platform technology that may interact, via the computer bus, with the memories(s) 406 (including the applications(s), component(s), API(s), data, etc. stored therein) and/or database 405 to implement or perform the machine readable instructions, methods, processes, elements or limitations, as illustrated, depicted, or described for the various flowcharts, illustrations, diagrams, figures, and/or other disclosure herein. According to some embodiments, the resolution server(s) 402 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 420. In some embodiments, computer network 420 may comprise a private network or local area network (LAN). Additionally, or alternatively, computer network 420 may comprise a public network such as the Internet.

Resolution server(s) 402 may further include or implement an operator interface configured to present information to an administrator or operator and/or receive inputs from the administrator or operator. As shown in FIG. 4, an operator interface may provide a display screen (e.g., via terminal 409). Resolution server(s) 402 may also provide I/O components (e.g., ports, capacitive or resistive touch sensitive input panels, keys, buttons, lights, LEDs), which may be directly accessible via or attached to resolution server(s) 402 or may be indirectly accessible via or attached to terminal 409. According to some embodiments, an administrator or operator may access the server 402 via terminal 409 to review information (e.g., transaction records), make changes, input training data, and/or perform other functions.

As described above herein, in some embodiments, resolution server(s) 402 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 404 (e.g., working in connection with the respective operating system in memories 406) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 4, resolution server(s) 402 are communicatively connected, via computer network 420 to the one or more user computing devices 411*m* and/or 413*m* via base stations 411*b* and 413*b*. In some embodiments, base stations 411*b* and 413*b* may comprise cellular base stations, such as cell towers, communicating to the one or more user computing devices 411*m* and 413*m* via wireless communications based on any one or more of various mobile phone standards, including NMT, GSM, CDMA, UMMTS, LTE, 5G, or the like. Additionally or alternatively, base stations 411*b* and 413*b* may comprise routers, wireless switches, or other such wireless connection points communicating to the one or more user computing devices 411*m* and 413*m* via wireless communications based on any one or more of various wireless standards, including by non-limiting example, IEEE 802.11a/b/c/g (WIFI), the BLUETOOTH standard, or the like.

Any of the one or more user computing devices 411*m* and/or 413*m* may comprise mobile devices and/or client devices for accessing and/or communications with resolution server(s) 402. In various embodiments, user computing devices 411*m* and/or 413*m* may comprise a cellular phone, a mobile phone, a tablet device, a personal data assistance (PDA), or the like, including, by non-limiting example, an APPLE iPhone or iPad device or a GOOGLE ANDROID based mobile phone or table. In addition, the one or more user computing devices 411*m* and/or 413*m* may implement or execute an operating system (OS) or mobile platform such as Apple's iOS and/or Google's Android operation system. Any of the one or more user computing devices 411*m* and/or 413*m* may comprise one or more processors and/or one or more memories for storing, implementing, or executing computing instructions or code, e.g., a mobile application, as described in various embodiments herein.

User computing devices 411*m* and/or 413*m* may comprise a wireless transceiver to receive and transmit wireless communications and/or to and from base stations 411*b* and/or 413*b*. In addition, each of the one or more user computing devices 411*m* and/or 413*m* may include a display screen for displaying graphics, images, text, product recommendations, data, pixels, features, and/or other such visualizations or information as described herein. In various embodiments, graphics, images, text, product recommendations, data, pixels, features, and/or other such visualizations or information may be received by server(s) 402 for display on the display screen of any one or more of user computing devices 411*m* and/or 413*m*. Additionally or alternatively, a user computer device may comprise, implement, have access to, render, or otherwise expose, at least in part, an interface or a guided user interface (GUI) for displaying text and/or images on its display screen.

Further as shown in FIG. 4, resolution server(s) 402 are communicatively connected, via computer network 420 to a checkout register 414 at, for example, a business location. In some embodiments, the resolution server(s) 402 may be connected to the checkout register 414 via a wired or wireless connection to the Internet. The resolution server(s) 402 may also obtain updated transaction records and/or additional information from the checkout register 414 at any time, including but not limited to, during each transaction, after each transaction, after a certain duration (e.g., at the end of every business day), and/or after a certain number of transactions.

In any event, each of the user computing devices 411*m* and/or 413*m*, the checkout register 414, and/or the terminal 409 may access and submit transaction records to the resolution server(s) 402. For example, the user computing devices 411*m* and/or 413*m* may access a business entity's website or mobile application to make purchases or otherwise communicate with and generate transaction records.

Similarly, the checkout register 414 may submit transaction records to the resolution server(s) as a result of purchases or returns made at a business entity's physical locations.

Thus, in view of the above, the novel systems, methods, and techniques disclosed herein provide increased overall transaction security and enhanced tracking accuracy for accounts or other types of units, e.g., within composite transactions and/or composite data sets, by resolving relationships within and among a plurality of different data sets. For example, the methods more accurately track transaction records when compared to conventional methods/techniques by identifying and sorting reflective identification tags (e.g., via the reflective ID resolver 104b) as well as non-reflective identification tags (e.g., via the transitive relationship resolver 104a), thereby generally increasing the data quality and the ability of entities to identify all related/associated receipts from purchases and returns to detect fraudulent transactions. Without the identification and sorting of the reflective identification tags, the corresponding data may be lost, such that any transitively related subsequent transaction records will not be sorted appropriately. Accordingly, conventional systems consistently lose reflective identification tags and fail to adequately maintain accurate transaction records and track consumer accounts or other types of units.

Further, fully resolving the transitive relationships between and among all obtained identification tags enables entities to more easily match payments from insurance companies or the like to accounts receivables at a store/pharmacy level, e.g., in the example pharmacy application, or other types of enterprise applications. This ensures that payments of any kind (e.g., partial or full, one-time or recurring) can be readily tracked and managed in a manner that greatly reduces the chances of errors related to tracking of accounts, particularly for reflective identification tags that are often overlooked or otherwise misrepresented by conventional systems/techniques. Additionally, the unique identifiers applied to each mutually exclusive set by the transitive relationship resolver 104a and/or the reflective ID resolver 104b may reduce user confusion and enhance the results of the transformation by assigning unique identifiers that are independent of the identification tags being evaluated. These and other benefits and advantages over known techniques are provided by the novel systems, methods, and techniques for increased overall transaction security and enhanced tracking accuracy for accounts described herein.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although user operations of one or more methods are illustrated and described as separate operations, one or more of the user operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for resolving relationships within data sets, the method comprising:
    evaluating, by one or more processors, whether a transitive relationship exists between unique pairs of identification tags in a plurality of identification tags;
    based on the evaluating, sorting, by the one or more processors, the plurality of identification tags into one or more mutually exclusive sets of related identification tags at least in part by assigning a unique identifier to each mutually exclusive set of the one or more mutually exclusive sets, and wherein each identification tag included in the plurality of identification tags and to which a respective identification tag is transitively related is sorted into a respective mutually exclusive set corresponding to the respective identification tag;
    removing, based on a removal indication, a respective identification tag from a respective mutually exclusive set that is not transitively related with any other identification tag in the respective mutually exclusive set;
    re-evaluating, by the one or more processors, whether each remaining pair of identification tags in the respective mutually exclusive set are transitively related;
    dividing, based on the re-evaluating, the respective mutually exclusive set into at least two mutually exclusive subsets each including a different, mutually exclusive subset of identification tags from the respective mutually exclusive set; and
    sorting, by the one or more processors, the respective identification tag into another mutually exclusive set of the one or more mutually exclusive sets that is different from the at least two mutually exclusive subsets.

2. The computer-implemented method of claim 1, wherein sorting the plurality of identification tags further comprises:
    sorting, by the one or more processors, the plurality of identification tags into a plurality of candidate sets;
    identifying, by the one or more processors, a respective candidate set of the plurality of candidate sets including a respective reflective identification tag; and
    comparing, by the one or more processors, the respective candidate set including the respective reflective identification tag to each candidate set of the plurality of candidate sets to perform a corrective action with respect to the respective candidate set including the respective reflective identification tag when the respective reflective identification tag is included in another candidate set of the plurality of candidate sets.

3. The computer-implemented method of claim 1, further comprising:
    responsive to determining a respective identification tag is transitively unrelated to every other identification tag in the plurality of identification tags, identifying, by the one or more processors, the respective identification tag as a respective lone member; and
    wherein sorting the plurality of identification tags into the one or more mutually exclusive sets is further based on the identification of the respective identification tag as the respective lone member.

4. The computer-implemented method of claim 1, wherein each identification tag of the plurality of identification tags includes a respective customer identification string, and determining whether the transitive relationship exists between each unique pair of identification tags includes determining whether respective customer identification strings of each unique pair of identification tags each identifies a same customer.

5. The computer-implemented method of claim 1, wherein at least one mutually exclusive set includes a respective lone member, and the respective lone member is a reflective identification tag.

6. The computer-implemented method of claim 1,
    further comprising sorting, by the one or more processors, the one or more mutually exclusive sets into a sequential order based on the respective identification tags included in each mutually exclusive set of the one or more mutually exclusive sets; and
    sorting, by the one or more processors, the each mutually exclusive set of the one or more mutually exclusive sets into two data sections, a first data section including the unique identifier and a second data section including each identification tag of the respective identification tags included in the each mutually exclusive set, and
    wherein the unique identifier of the each mutually exclusive set of the one or more mutually exclusive sets is based on a relative position of the each mutually exclusive set within the sequential order.

7. A system for resolving relationships within data sets, the system comprising:
    one or more processors; and
    one or more non-transitory memories,
    wherein the one or more non-transitory memories store computer-readable instructions that specially configure the system such that, when executed by the one or more processors, the one or more non-transitory memories cause the system to:
        evaluate whether a transitive relationship exists between unique pairs of identification tags in a plurality of identification tags,
        based on the evaluation, sort the plurality of identification tags into one or more mutually exclusive sets of related identification tags at least in part by assigning a unique identifier to each mutually exclusive set of the one or more mutually exclusive sets, and wherein each identification tag included in the plurality of identification tags and to which a respective identification tag is transitively related is sorted into a respective mutually exclusive set corresponding to the respective identification tag, remove, based on a removal indication, a respective identification tag from a respective mutually exclusive set that is not transitively related with any other identification tag in the respective mutually exclusive set, re-evaluate whether each remaining pair of identification tags in the respective mutually exclusive set are transitively related, divide, based on the re-evaluation, the respective mutually exclusive set into at least two mutually exclusive subsets each including a different, mutually exclusive subset of identification tags from the respective mutually exclusive set, and sort the respective identification tag into another mutually exclusive set of the one or more mutually exclusive sets that is different from the at least two mutually exclusive subsets.

8. The system of claim 7, wherein the instructions, when executed, further cause the system to:
sort the plurality of identification tags into a plurality of candidate sets;
identify a respective candidate set of the plurality of candidate sets including a respective reflective identification tag; and
compare the respective candidate set including the respective reflective identification tag to each candidate set of the plurality of candidate sets to perform a corrective action with respect to the respective candidate set including the respective reflective identification tag when the respective reflective identification tag is included in another candidate set of the plurality of candidate sets.

9. The system of claim 7, wherein the instructions, when executed, further cause the system to:
responsive to determining a respective identification tag is transitively unrelated to every other identification tag in the plurality of identification tags, identify the respective identification tag as a respective lone member; and
sort the plurality of identification tags into the one or more mutually exclusive sets based on the identification of the respective identification tag as the respective lone member.

10. The system of claim 7, wherein the instructions, when executed, further cause the system to:
obtain a new identification tag;
determine whether the transitive relationship exists between the new identification tag and at least one identification tag from each of the one or more mutually exclusive sets of related identification tags; and
based on the determination, sort the new identification tag into a respective mutually exclusive set.

11. The system of claim 10, wherein the one or more mutually exclusive sets includes a plurality of mutually exclusive sets, the new identification tag is transitively related to a respective identification tag in two or more of the plurality of mutually exclusive sets, and the instructions, when executed, further cause the system to:
sort the new identification tag into the respective mutually exclusive set by concatenating the two or more of the plurality of mutually exclusive sets.

12. A non-transitory computer-readable storage medium having stored thereon a set of instructions, executable by a processor, for resolving relationships within data sets, the instructions comprising:
instructions for evaluating whether a transitive relationship exists between unique pairs of identification tags in a plurality of identification tags;
instructions for, based on the evaluating, sorting the plurality of identification tags into one or more mutually exclusive sets of related identification tags at least in part by assigning a unique identifier to each mutually exclusive set of the one or more mutually exclusive sets, and each identification tag included in the plurality of identification tags and to which a respective identification tag is transitively related is sorted into a respective mutually exclusive set corresponding to the respective identification tag;
instructions for removing a respective identification tag from a respective mutually exclusive set that is not transitively related with any other identification tag in the respective mutually exclusive set;
instructions for re-evaluating whether each remaining pair of identification tags in the respective mutually exclusive set are transitively related;
instructions for dividing, based on the re-evaluating, the respective mutually exclusive set into at least two mutually exclusive subsets each including a different, mutually exclusive subset of identification tags from the respective mutually exclusive set; and
instructions for sorting the respective identification tag into another mutually exclusive set of the one or more mutually exclusive sets that is different from the at least two mutually exclusive subsets.

13. The non-transitory computer-readable storage medium of claim 12, wherein the instructions further comprise:
instructions for sorting the plurality of identification tags into a plurality of candidate sets;
instructions for identifying a respective candidate set of the plurality of candidate sets including a respective reflective identification tag; and
instructions for comparing the respective candidate set including the respective reflective identification tag to each candidate set of the plurality of candidate sets to perform a corrective action with respect to the respective candidate set including the respective reflective identification tag when the respective reflective identification tag is included in another candidate set of the plurality of candidate sets.

14. The non-transitory computer-readable storage medium of claim 12, wherein the instructions further comprise:
instructions for, responsive to determining a respective identification tag is transitively unrelated to every other identification tag in the plurality of identification tags, identifying the respective identification tag as a respective lone member; and
wherein instructions for sorting the plurality of identification tags into the one or more mutually exclusive sets is further based on the identification of the respective identification tag as the respective lone member.

15. The non-transitory computer-readable storage medium of claim 12, wherein at least one mutually exclusive set includes a respective lone member, and the respective lone member is a reflective identification tag.

* * * * *